US011238889B2

(12) United States Patent
Seltzer et al.

(10) Patent No.: US 11,238,889 B2
(45) Date of Patent: Feb. 1, 2022

(54) SYSTEMS AND METHODS FOR REMOTE MULTI-DIRECTIONAL BARK DETERRENCE

(71) Applicant: Radio Systems Corporation, Knoxville, TN (US)

(72) Inventors: Richard Seltzer, Knoxville, TN (US); Jonathan William Huber, Knoxville, TN (US); Paul Case, Knoxville, TN (US); John Hatcher, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 36 days.

(21) Appl. No.: 16/522,593

(22) Filed: Jul. 25, 2019

(65) Prior Publication Data
US 2021/0027801 A1 Jan. 28, 2021

(51) Int. Cl.
*G10L 25/78* (2013.01)
*H04R 5/04* (2006.01)
(Continued)

(52) U.S. Cl.
CPC ............ *G10L 25/78* (2013.01); *A01K 15/022* (2013.01); *H04R 5/027* (2013.01); *H04R 5/04* (2013.01); *G10L 2025/783* (2013.01)

(58) Field of Classification Search
CPC .... A01K 15/022; A01K 15/023; G10L 25/78; G10L 17/26; G10L 2025/783;
(Continued)

(56) References Cited

U.S. PATENT DOCUMENTS 2,364,994 A 12/1944 Moore
2,741,224 A 4/1956 Putnam
(Continued)

FOREIGN PATENT DOCUMENTS

CN 101937015 A 1/2011
CN 101112181 B 11/2012
(Continued)

OTHER PUBLICATIONS

Canine 10RC-HP10 Instructions, Jul. 8, 2017, Info Unlimited https://www.amazing1.com/content/download/CANINE10_Instructions.pdf (Year: 2017).*
(Continued)

*Primary Examiner* — Yogeshkumar Patel
(74) *Attorney, Agent, or Firm* — Baker, Donelson, Bearman, Caldwell & Berkowitz PC

(57) ABSTRACT

An apparatus is described that comprises a microphone array and a plurality of transducers. The microphone array and the plurality of transducers are communicatively coupled with at least one processor. The apparatus includes the microphone array for receiving at least one signal. Each transducer of the plurality of transducers is configured to deliver a correction signal along a transducer beam spread axis, wherein the plurality of transducers is positioned on the apparatus for providing a combined transducer beam spread coverage in the horizontal plane. One or more applications running on the at least one processor use information of the at least one signal to detect a sound event. The detecting the sound event includes selecting transducers from the plurality of transducers and instructing the selected transducers to deliver a correction signal.

19 Claims, 13 Drawing Sheets

(51) Int. Cl.
*A01K 15/02* (2006.01)
*H04R 5/027* (2006.01)

(58) Field of Classification Search
CPC ........ G10L 25/72; G10L 25/51; H04R 5/027; H04R 5/04; H04R 29/005; H04R 1/023
See application file for complete search history.

(56) References Cited

U.S. PATENT DOCUMENTS

| | | | |
|---|---|---|---|
| 3,182,211 A | 5/1965 | Maratuech et al. |
| 3,184,730 A | 5/1965 | Irish |
| 3,500,373 A | 3/1970 | Arthur |
| 3,735,757 A | 5/1973 | MacFarland |
| 4,180,013 A | 12/1979 | Smith |
| 4,426,884 A | 1/1984 | Polchaninoff |
| 4,783,646 A | 11/1988 | Matsuzaki |
| 4,794,402 A | 12/1988 | Gonda et al. |
| 4,802,482 A | 2/1989 | Gonda et al. |
| 4,947,795 A | 8/1990 | Farkas |
| 4,969,418 A | 11/1990 | Jones |
| 5,054,428 A | 10/1991 | Farkus |
| 5,159,580 A | 10/1992 | Andersen et al. |
| 5,161,485 A | 11/1992 | McDade |
| 5,182,032 A | 1/1993 | Dickie et al. |
| 5,207,178 A | 5/1993 | McDade et al. |
| 5,207,179 A | 5/1993 | Arthur et al. |
| 5,471,954 A | 12/1995 | Gonda et al. |
| 5,526,006 A | 6/1996 | Akahane et al. |
| 5,559,498 A | 9/1996 | Westriok et al. |
| 5,576,972 A | 11/1996 | Harrison |
| 5,586,521 A | 12/1996 | Kelley |
| 5,601,054 A | 2/1997 | So |
| 5,642,690 A | 7/1997 | Calabrese et al. |
| 5,749,324 A | 5/1998 | Moore |
| 5,794,569 A | 8/1998 | Titus et al. |
| 5,810,747 A | 9/1998 | Brudny et al. |
| 5,815,077 A | 9/1998 | Christiansen |
| 5,844,489 A | 12/1998 | Yarnall, Jr. et al. |
| 5,857,433 A | 1/1999 | Files |
| 5,870,029 A | 2/1999 | Otto et al. |
| 5,872,516 A | 2/1999 | Bonge, Jr. |
| 5,886,669 A | 3/1999 | Kita |
| 5,913,284 A | 6/1999 | Van Curen et al. |
| 5,923,254 A | 7/1999 | Brune |
| 5,927,233 A | 7/1999 | Mainini et al. |
| 5,933,079 A | 8/1999 | Frink |
| 5,934,225 A | 8/1999 | Williams |
| 5,949,350 A | 9/1999 | Girard et al. |
| 5,957,983 A | 9/1999 | Tominaga |
| 5,982,291 A | 11/1999 | Williams et al. |
| 6,016,100 A | 1/2000 | Boyd et al. |
| 6,019,066 A | 2/2000 | Taylor |
| 6,028,531 A | 2/2000 | Wanderlich |
| 6,047,664 A | 4/2000 | Lyerly |
| 6,067,018 A | 5/2000 | Skelton et al. |
| 6,075,443 A | 6/2000 | Schepps et al. |
| 6,166,643 A | 12/2000 | Janning et al. |
| 6,170,439 B1 | 1/2001 | Duncan et al. |
| 6,184,790 B1 | 2/2001 | Gerig |
| 6,196,990 B1 | 3/2001 | Zicherman |
| 6,204,762 B1 | 3/2001 | Dering et al. |
| 6,215,314 B1 | 4/2001 | Frankewich, Jr. |
| 6,230,031 B1 | 5/2001 | Barber |
| 6,230,661 B1 | 5/2001 | Yarnall, Jr. et al. |
| 6,232,880 B1 | 5/2001 | Anderson et al. |
| 6,271,757 B1 | 8/2001 | Touchton et al. |
| 6,297,766 B1 | 10/2001 | Koeller |
| 6,327,999 B1 | 12/2001 | Gerig |
| 6,353,390 B1 | 3/2002 | Beri et al. |
| 6,360,697 B1 | 3/2002 | Williams |
| 6,360,698 B1 | 3/2002 | Stapelfeld et al. |
| 6,404,338 B1 | 6/2002 | Koslar |
| 6,415,742 B1 | 7/2002 | Lee et al. |
| 6,426,464 B1 | 7/2002 | Spellman et al. |
| 6,427,079 B1 | 7/2002 | Schneider et al. |
| 6,431,121 B1 | 8/2002 | Mainini et al. |
| 6,431,122 B1 | 8/2002 | Westrick et al. |
| 6,441,778 B1 | 8/2002 | Durst et al. |
| 6,459,378 B2 | 10/2002 | Gerig |
| 6,487,992 B1 | 12/2002 | Hollis |
| 6,561,137 B2 | 5/2003 | Oakman |
| 6,581,546 B1 | 6/2003 | Dalland et al. |
| 6,588,376 B1 | 7/2003 | Groh |
| 6,598,563 B2 | 7/2003 | Kim et al. |
| 6,600,422 B2 | 7/2003 | Barry et al. |
| 6,637,376 B2 | 10/2003 | Lee et al. |
| 6,657,544 B2 | 12/2003 | Barry et al. |
| 6,668,760 B2 | 12/2003 | Groh et al. |
| 6,700,492 B2 | 3/2004 | Touchton et al. |
| 6,747,555 B2 | 6/2004 | Fellenstein et al. |
| 6,798,887 B1 | 9/2004 | Andre |
| 6,799,537 B1 | 10/2004 | Liao |
| 6,807,720 B2 | 10/2004 | Brune et al. |
| 6,820,025 B2 | 11/2004 | Bachmann et al. |
| 6,825,768 B2 | 11/2004 | Stapelfeld et al. |
| 6,830,012 B1 | 12/2004 | Swan |
| 6,833,790 B2 | 12/2004 | Mejia et al. |
| 6,874,447 B1 | 4/2005 | Kobett |
| 6,888,502 B2 | 5/2005 | Beigel et al. |
| 6,901,883 B2 | 6/2005 | Gillis et al. |
| 6,903,682 B1 | 6/2005 | Maddox |
| 6,907,844 B1 | 6/2005 | Crist et al. |
| 6,907,883 B2 | 6/2005 | Lin |
| 6,921,089 B2 | 7/2005 | Groh et al. |
| 6,923,146 B2 | 8/2005 | Korbitz et al. |
| 6,928,958 B2 | 8/2005 | Crist et al. |
| 6,937,647 B1 | 8/2005 | Boyd et al. |
| 6,956,483 B2 | 10/2005 | Schmitt et al. |
| 6,970,090 B1 | 11/2005 | Sciarra |
| 7,061,385 B2 | 6/2006 | Fong et al. |
| 7,079,024 B2 | 7/2006 | Alarcon et al. |
| 7,114,466 B1 | 10/2006 | Mayer |
| 7,142,167 B2 | 11/2006 | Rochelle et al. |
| 7,164,354 B1 | 1/2007 | Panzer |
| 7,173,535 B2 | 2/2007 | Bach et al. |
| 7,198,009 B2 | 4/2007 | Crist et al. |
| 7,222,589 B2 | 5/2007 | Lee et al. |
| 7,249,572 B2 | 7/2007 | Goetzl et al. |
| 7,252,051 B2 | 8/2007 | Napolez et al. |
| 7,259,718 B2 | 8/2007 | Patterson et al. |
| 7,267,081 B2 | 9/2007 | Steinbacher |
| 7,275,502 B2 | 10/2007 | Boyd et al. |
| 7,296,540 B2 | 11/2007 | Boyd |
| 7,319,397 B2 | 1/2008 | Chung et al. |
| 7,328,671 B2 | 2/2008 | Lawrence |
| 7,339,474 B2 | 3/2008 | Easley et al. |
| 7,382,328 B2 | 6/2008 | Lee, IV et al. |
| 7,394,390 B2 | 7/2008 | Gerig |
| 7,395,966 B2 | 7/2008 | Braiman |
| 7,403,744 B2 | 7/2008 | Bridgelall |
| 7,404,379 B2 | 7/2008 | Nottingham et al. |
| 7,411,492 B2 | 8/2008 | Greenberg et al. |
| 7,426,906 B2 | 9/2008 | Nottingham et al. |
| 7,434,541 B2 | 10/2008 | Kates |
| 7,443,298 B2 | 10/2008 | Cole et al. |
| 7,477,155 B2 | 1/2009 | Bach et al. |
| 7,503,285 B2 | 3/2009 | Mainini et al. |
| 7,518,275 B2 | 4/2009 | Suzuki et al. |
| 7,518,522 B2 | 4/2009 | So et al. |
| 7,538,679 B2 | 5/2009 | Shanks |
| 7,546,817 B2 | 6/2009 | Moore |
| 7,552,699 B2 | 6/2009 | Moore |
| 7,559,291 B2 | 7/2009 | Reinhart |
| 7,562,640 B2 | 7/2009 | Lalor |
| 7,565,885 B2 | 7/2009 | Moore |
| 7,574,979 B2 | 8/2009 | Nottingham et al. |
| 7,583,931 B2 | 9/2009 | Eu et al. |
| 7,602,302 B2 | 10/2009 | Hokuf et al. |
| 7,612,668 B2 | 11/2009 | Harvey |
| 7,616,124 B2 | 11/2009 | Paessel et al. |
| 7,656,291 B2 | 2/2010 | Rochelle et al. |
| 7,658,166 B1 | 2/2010 | Rheinschmidt, Jr. et al. |
| 7,667,599 B2 | 2/2010 | Mainini et al. |
| 7,667,607 B2 | 2/2010 | Gerig et al. |

(56) References Cited

U.S. PATENT DOCUMENTS

| | | |
|---|---|---|
| 7,680,645 B2 | 3/2010 | Li et al. |
| 7,705,736 B1 | 4/2010 | Kedziora |
| 7,710,263 B2 | 5/2010 | Boyd |
| 7,760,137 B2 | 7/2010 | Martucci et al. |
| 7,779,788 B2 | 8/2010 | Moore |
| 7,786,876 B2 | 8/2010 | Troxler et al. |
| 7,804,724 B2 | 9/2010 | Way |
| 7,814,865 B2 | 10/2010 | Tracy et al. |
| 7,828,221 B2 | 11/2010 | Kwon |
| 7,830,257 B2 | 11/2010 | Hassell |
| 7,834,769 B2 | 11/2010 | Hinkle et al. |
| 7,841,301 B2 | 11/2010 | Mainini et al. |
| 7,856,947 B2 | 12/2010 | Giunta |
| 7,864,057 B2 | 1/2011 | Milnes et al. |
| 7,868,912 B2 | 1/2011 | Venetianer et al. |
| 7,900,585 B2 | 3/2011 | Lee et al. |
| 7,918,190 B2 | 4/2011 | Belcher et al. |
| 7,944,359 B2 | 5/2011 | Fong et al. |
| 7,946,252 B2 | 5/2011 | Lee, IV et al. |
| 7,978,078 B2 | 7/2011 | Copeland et al. |
| 7,996,983 B2 | 8/2011 | Lee et al. |
| 8,011,327 B2 | 9/2011 | Mainini et al. |
| 8,047,161 B2 | 11/2011 | Moore et al. |
| 8,049,630 B2 | 11/2011 | Chao et al. |
| 8,065,978 B2 | 11/2011 | Duncan et al. |
| 8,069,823 B2 | 12/2011 | Mainini et al. |
| 8,098,164 B2 | 1/2012 | Gerig et al. |
| 8,159,355 B2 | 4/2012 | Gerig et al. |
| 8,161,915 B2 | 4/2012 | Kim |
| 8,185,345 B2 | 5/2012 | Mainini |
| 8,232,909 B2 | 7/2012 | Kroeger et al. |
| 8,240,085 B2 | 8/2012 | Hill |
| 8,269,504 B2 | 9/2012 | Gerig |
| 8,274,396 B2 | 9/2012 | Gurley et al. |
| 8,297,233 B2 | 10/2012 | Rich et al. |
| 8,342,134 B2 | 1/2013 | Lee et al. |
| 8,342,135 B2 | 1/2013 | Peinetti et al. |
| 8,430,064 B2 | 4/2013 | Groh et al. |
| 8,436,735 B2 | 5/2013 | Mainini et al. |
| 8,447,510 B2 | 5/2013 | Fitzpatrick et al. |
| 8,451,130 B2 | 5/2013 | Mainini |
| 8,456,296 B2 | 6/2013 | Piltonen et al. |
| 8,483,262 B2 | 7/2013 | Mainini et al. |
| 8,714,113 B2 | 5/2014 | Lee, IV et al. |
| 8,715,824 B2 | 5/2014 | Rawlings et al. |
| 8,736,499 B2 | 5/2014 | Goetzl et al. |
| 8,779,925 B2 | 7/2014 | Rich et al. |
| 8,803,692 B2 | 8/2014 | Goetzl et al. |
| 8,807,089 B2 | 8/2014 | Brown et al. |
| 8,823,513 B2 | 9/2014 | Jameson et al. |
| 8,854,215 B1 | 10/2014 | Ellis et al. |
| 8,866,605 B2 | 10/2014 | Gibson |
| 8,908,034 B2 | 12/2014 | Bordonaro |
| 8,917,172 B2 | 12/2014 | Charych |
| 8,947,240 B2 | 2/2015 | Mainini |
| 8,967,085 B2 | 3/2015 | Gillis et al. |
| 9,035,773 B2 | 5/2015 | Petersen et al. |
| 9,125,380 B2 | 9/2015 | Deutsch |
| 9,131,660 B2 | 9/2015 | Womble |
| 9,186,091 B2 | 11/2015 | Mainini et al. |
| 9,204,251 B1 | 12/2015 | Mendelson et al. |
| 9,307,745 B2 | 4/2016 | Mainini |
| 9,516,863 B2 | 12/2016 | Gerig et al. |
| 9,861,076 B2 | 1/2018 | Rochelle et al. |
| 10,514,439 B2 | 12/2019 | Seltzer |
| 10,757,672 B1 | 8/2020 | Knas et al. |
| 2002/0010390 A1 | 1/2002 | Guice et al. |
| 2002/0015094 A1 | 2/2002 | Kuwano et al. |
| 2002/0036569 A1 | 3/2002 | Martin |
| 2002/0092481 A1 | 7/2002 | Spooner |
| 2002/0196151 A1 | 12/2002 | Troxler |
| 2003/0034887 A1 | 2/2003 | Crabtree et al. |
| 2003/0035051 A1 | 2/2003 | Cho et al. |
| 2003/0116099 A1 | 6/2003 | Kim et al. |
| 2003/0154928 A1 | 8/2003 | Lee et al. |
| 2003/0218539 A1 | 11/2003 | Hight |
| 2004/0108939 A1 | 6/2004 | Giunta |
| 2004/0162875 A1 | 8/2004 | Brown |
| 2004/0263322 A1 | 12/2004 | Onaru et al. |
| 2005/0000469 A1 | 1/2005 | Giunta et al. |
| 2005/0007251 A1 | 1/2005 | Crabtree et al. |
| 2005/0020279 A1 | 1/2005 | Markhovsky et al. |
| 2005/0035865 A1 | 2/2005 | Brennan et al. |
| 2005/0059909 A1 | 3/2005 | Burgess |
| 2005/0081797 A1 | 4/2005 | Laitinen et al. |
| 2005/0139169 A1 | 6/2005 | So et al. |
| 2005/0145196 A1 | 7/2005 | Crist et al. |
| 2005/0145199 A1 | 7/2005 | Napolez et al. |
| 2005/0148346 A1 | 7/2005 | Maloney et al. |
| 2005/0172912 A1 | 8/2005 | Crist et al. |
| 2005/0217606 A1 | 10/2005 | Lee et al. |
| 2005/0231353 A1 | 10/2005 | DiPoala et al. |
| 2005/0254663 A1 | 11/2005 | Raptopoulos et al. |
| 2005/0258715 A1 | 11/2005 | Schlabach et al. |
| 2005/0280544 A1 | 12/2005 | Mishelevich |
| 2005/0280546 A1 | 12/2005 | Ganley et al. |
| 2005/0288007 A1 | 12/2005 | Benco et al. |
| 2006/0000015 A1 | 1/2006 | Duncan |
| 2006/0011145 A1 | 1/2006 | Kates et al. |
| 2006/0037559 A1 | 2/2006 | Belcher |
| 2006/0061469 A1 | 3/2006 | Jaeger et al. |
| 2006/0092676 A1 | 5/2006 | Liptak et al. |
| 2006/0102100 A1 | 5/2006 | Becker et al. |
| 2006/0102101 A1 | 5/2006 | Kim |
| 2006/0112901 A1 | 6/2006 | Gomez |
| 2006/0196445 A1 | 9/2006 | Kates |
| 2006/0197672 A1 | 9/2006 | Talamas, Jr. et al. |
| 2007/0011339 A1 | 1/2007 | Brown |
| 2007/0197878 A1 | 8/2007 | Shklarski |
| 2007/0204803 A1 | 9/2007 | Ramsay |
| 2007/0204804 A1 | 9/2007 | Swanson et al. |
| 2007/0209604 A1 | 9/2007 | Groh et al. |
| 2007/0249470 A1 | 10/2007 | Niva et al. |
| 2007/0266959 A1 | 11/2007 | Brooks et al. |
| 2008/0004539 A1 | 1/2008 | Ross |
| 2008/0055155 A1 | 3/2008 | Hensley et al. |
| 2008/0058670 A1 | 3/2008 | Mainini et al. |
| 2008/0061978 A1 | 3/2008 | Huang |
| 2008/0119757 A1 | 5/2008 | Winter |
| 2008/0129457 A1 | 6/2008 | Ritter et al. |
| 2008/0141949 A1 | 6/2008 | Taylor |
| 2008/0143516 A1 | 6/2008 | Mock et al. |
| 2008/0156277 A1 | 7/2008 | Mainini et al. |
| 2008/0163827 A1 | 7/2008 | Goetzl |
| 2008/0186167 A1 | 8/2008 | Ramachandra |
| 2008/0204322 A1 | 8/2008 | Oswald et al. |
| 2008/0216766 A1 | 9/2008 | Martin et al. |
| 2008/0236514 A1 | 10/2008 | Johnson et al. |
| 2008/0252527 A1 | 10/2008 | Garcia |
| 2009/0000566 A1 | 1/2009 | Kim |
| 2009/0002188 A1 | 1/2009 | Greenberg |
| 2009/0012355 A1 | 1/2009 | Lin |
| 2009/0020002 A1 | 1/2009 | Williams et al. |
| 2009/0025651 A1 | 1/2009 | Lalor |
| 2009/0031966 A1 | 2/2009 | Kates |
| 2009/0061772 A1 | 3/2009 | Moon et al. |
| 2009/0082830 A1 | 3/2009 | Folkerts et al. |
| 2009/0102668 A1 | 4/2009 | Thompson et al. |
| 2009/0112284 A1 | 4/2009 | Smith et al. |
| 2009/0129338 A1 | 5/2009 | Horn et al. |
| 2009/0224909 A1 | 9/2009 | Derrick et al. |
| 2009/0239586 A1 | 9/2009 | Boeve et al. |
| 2009/0289785 A1 | 11/2009 | Leonard |
| 2009/0289844 A1 | 11/2009 | Palsgrove et al. |
| 2009/0299742 A1 | 12/2009 | Toman et al. |
| 2010/0008011 A1 | 1/2010 | Ogram |
| 2010/0019903 A1 | 1/2010 | Sawaya |
| 2010/0047119 A1 | 2/2010 | Cressy |
| 2010/0049364 A1 | 2/2010 | Landry et al. |
| 2010/0107985 A1 | 5/2010 | O'Hare |
| 2010/0139576 A1 | 6/2010 | Kim et al. |
| 2010/0201525 A1 | 8/2010 | Bahat et al. |
| 2010/0231391 A1 | 9/2010 | Dror et al. |
| 2010/0238022 A1 | 9/2010 | Au et al. |

(56) References Cited

U.S. PATENT DOCUMENTS

| | | |
|---|---|---|
| 2010/0315241 A1 | 12/2010 | Jow |
| 2010/0321180 A1 | 12/2010 | Dempsey et al. |
| 2011/0140967 A1 | 6/2011 | Lopez et al. |
| 2011/0182438 A1 | 7/2011 | Koike et al. |
| 2011/0203529 A1 | 8/2011 | Mainini et al. |
| 2012/0000431 A1 | 1/2012 | Khoshkish et al. |
| 2012/0006282 A1 | 1/2012 | Kates |
| 2012/0032855 A1 | 2/2012 | Reede et al. |
| 2012/0037088 A1 | 2/2012 | Altenhofen |
| 2012/0078139 A1 | 3/2012 | Aldridge et al. |
| 2012/0087204 A1 | 4/2012 | Urbano et al. |
| 2012/0132151 A1 | 5/2012 | Touchton et al. |
| 2012/0165012 A1 | 6/2012 | Fischer et al. |
| 2012/0236688 A1 | 9/2012 | Spencer et al. |
| 2012/0312250 A1 | 12/2012 | Jesurum |
| 2013/0099920 A1 | 4/2013 | Song et al. |
| 2013/0099922 A1 | 4/2013 | Lohbihler |
| 2013/0157564 A1 | 6/2013 | Curtis et al. |
| 2013/0169441 A1 | 7/2013 | Wilson |
| 2013/0203027 A1 | 8/2013 | De Villers-Sidani et al. |
| 2013/0321159 A1 | 12/2013 | Schofield et al. |
| 2013/0340305 A1 | 12/2013 | Mobley |
| 2014/0020635 A1 | 1/2014 | Sayers et al. |
| 2014/0053788 A1 | 2/2014 | Riddell |
| 2014/0057232 A1 | 2/2014 | Wetmore et al. |
| 2014/0062695 A1 | 3/2014 | Rosen et al. |
| 2014/0069350 A1 | 3/2014 | Riddell |
| 2014/0073939 A1 | 3/2014 | Rodriguez-Llorente et al. |
| 2014/0120943 A1 | 5/2014 | Shima |
| 2014/0123912 A1 | 5/2014 | Menkes et al. |
| 2014/0132608 A1 | 5/2014 | Mund et al. |
| 2014/0174376 A1 | 6/2014 | Touchton et al. |
| 2014/0176305 A1 | 6/2014 | Aljadeff |
| 2014/0228649 A1 | 8/2014 | Rayner et al. |
| 2014/0228927 A1 | 8/2014 | Ahmad et al. |
| 2014/0253368 A1 | 9/2014 | Holder |
| 2014/0253389 A1 | 9/2014 | Beauregard |
| 2014/0261235 A1 | 9/2014 | Rich et al. |
| 2014/0265568 A1 | 9/2014 | Crafts et al. |
| 2014/0267299 A1 | 9/2014 | Couse |
| 2014/0275824 A1 | 9/2014 | Couse et al. |
| 2014/0276278 A1 | 9/2014 | Smith et al. |
| 2014/0307888 A1 | 10/2014 | Alderson et al. |
| 2014/0343599 A1 | 11/2014 | Smith et al. |
| 2014/0358592 A1 | 12/2014 | Wedig et al. |
| 2015/0040840 A1 | 2/2015 | Muetzel et al. |
| 2015/0043744 A1 | 2/2015 | Lagodzinski et al. |
| 2015/0053144 A1 | 2/2015 | Bianchi et al. |
| 2015/0075446 A1 | 3/2015 | Hu |
| 2015/0080013 A1 | 3/2015 | Venkatraman et al. |
| 2015/0107531 A1 | 4/2015 | Golden |
| 2015/0149111 A1 | 5/2015 | Kelly et al. |
| 2015/0163412 A1 | 6/2015 | Holley et al. |
| 2015/0172872 A1 | 6/2015 | Alsehly et al. |
| 2015/0199490 A1 | 7/2015 | Iancu et al. |
| 2015/0223013 A1 | 8/2015 | Park et al. |
| 2015/0289111 A1 | 10/2015 | Ozkan et al. |
| 2015/0350848 A1 | 12/2015 | Eramian |
| 2015/0358768 A1 | 12/2015 | Luna et al. |
| 2016/0015005 A1 | 1/2016 | Brown, Jr. et al. |
| 2016/0021506 A1 | 1/2016 | Bonge, Jr. |
| 2016/0021850 A1 | 1/2016 | Stapelfeld et al. |
| 2016/0029466 A1 | 1/2016 | DeMao et al. |
| 2016/0044444 A1 | 2/2016 | Rattner et al. |
| 2016/0084801 A1 | 3/2016 | Robinson et al. |
| 2016/0094419 A1 | 3/2016 | Peacock et al. |
| 2016/0102879 A1 | 4/2016 | Guest et al. |
| 2016/0125867 A1 | 5/2016 | Jarvinen et al. |
| 2016/0150362 A1 | 5/2016 | Shaprio et al. |
| 2016/0174099 A1 | 6/2016 | Goldfain |
| 2016/0178392 A1 | 6/2016 | Goldfain |
| 2016/0187454 A1 | 6/2016 | Orman et al. |
| 2016/0234649 A1 | 8/2016 | Finnerty et al. |
| 2016/0253987 A1 | 9/2016 | Chattell |
| 2016/0292635 A1 | 10/2016 | Todasco |
| 2016/0335917 A1 | 11/2016 | Lydecker et al. |
| 2016/0363664 A1 | 12/2016 | Mindell et al. |
| 2016/0366813 A1 | 12/2016 | Haneda et al. |
| 2017/0026798 A1 | 1/2017 | Prevatt |
| 2017/0212205 A1 | 7/2017 | Bialer et al. |
| 2017/0323630 A1 | 11/2017 | Stickney et al. |
| 2018/0027772 A1 | 2/2018 | Gordon et al. |
| 2018/0077509 A1 | 3/2018 | Jones et al. |
| 2018/0078735 A1 | 3/2018 | Dalgleish et al. |
| 2018/0094451 A1 | 4/2018 | Peter et al. |
| 2018/0188351 A1 | 7/2018 | Jones et al. |
| 2018/0190311 A1* | 7/2018 | Kato .......... G10L 21/0264 |
| 2018/0210704 A1 | 7/2018 | Jones et al. |
| 2018/0234134 A1 | 8/2018 | Tang et al. |
| 2018/0235182 A1 | 8/2018 | Bocknek |
| 2018/0249680 A1 | 9/2018 | Van Curen et al. |
| 2018/0303066 A1 | 10/2018 | Weimin et al. |
| 2018/0315262 A1 | 11/2018 | Love et al. |
| 2019/0013003 A1 | 1/2019 | Baughman et al. |
| 2019/0066651 A1 | 2/2019 | Yang |
| 2019/0110430 A1 | 4/2019 | Badiou |
| 2019/0165832 A1 | 5/2019 | Khanduri et al. |
| 2020/0367810 A1 | 11/2020 | Shouldice et al. |

FOREIGN PATENT DOCUMENTS

| | | | |
|---|---|---|---|
| CN | 102793568 B | | 12/2014 |
| JP | H0974774 A | | 3/1997 |
| KR | 20130128704 A | | 11/2013 |
| KR | 20180029636 A | * | 3/2018 |
| KR | 20180059684 A | | 6/2018 |
| WO | WO-02060240 A3 | | 2/2003 |
| WO | WO-2006000015 A1 | | 1/2006 |
| WO | WO-2008085812 A2 | | 7/2008 |
| WO | WO-2008140992 A1 | | 11/2008 |
| WO | WO-2009105243 A2 | | 8/2009 |
| WO | WO-2009106896 A2 | | 9/2009 |
| WO | WO-2011055004 A1 | | 5/2011 |
| WO | WO-2011136816 A1 | | 11/2011 |
| WO | WO-2011160698 A1 | | 12/2011 |
| WO | WO-2012122607 A1 | | 9/2012 |
| WO | WO-2015015047 A1 | | 2/2015 |
| WO | WO-2016204799 A1 | | 12/2016 |

OTHER PUBLICATIONS

Ayele E., et al., "Highly Energy Efficient Animal Mobility Driven BLE Beacon Advertising Control for Wildlife Monitoring," IEEE Xplore, 2020, 8 pages.

Crutchfield., "What You Need to Know About Sound Masking," pp. 1-7.

Integrated Building System., "The What, Where, Why and How of Sound Masking," 2016, 6 pages.

Nam M., et al., "Combined Scheduling of Sensing and Communication for Real-Time Indoor Tracking in Assisted Living," IEEE Real Time System Symposium, 2007, 10 pages.

Radoi I.E., et al., "Tracking and Monitoring Horses in the Wild Using Wireless Sensor Networks," IEEE International Conference on Wireless and Mobile Computing, Networking and Communications, 2015, 8 pages.

Supplementary European Search Report for European Application No. 18887374.9, dated Aug. 10, 2021, 7 pages.

Supplementary European Search Report for European Application No. 18888089.2, dated Aug. 6, 2021, 6 pages.

Supplementary European Search Report for European Application No. 18889799.5, dated Aug. 13, 2021, 10 pages.

Wood D.J., "Speech Privacy & Sound Masking In Modern Architecture," 2008, 51 pages.

Baba A. I., et al., "Calibrating Time of Flight in Two Way Ranging," IEEE Xplore Digital Library, Dec. 2011, pp. 393-397.

Eileen A., "How to Protect Your Dog From Loud and Scary Sounds," 2013, pp. 1-8.

Extended European Search Report for Application No. EP17180645, dated May 9, 2018, 7 pages.

(56) References Cited

OTHER PUBLICATIONS

Extended European Search Report for European Application No. 18738816, dated Sep. 29, 2020, 10 pages.
Extended European Search Report for European Application No. 11784149.4, dated Nov. 17, 2017, 7 pages.
Extended European Search Report for European Application No. 15735439.0, dated Oct. 18, 2017, 9 pages.
Extended European Search Report for European Application No. 15895839.7, dated Oct. 9, 2018, 5 pages.
Extended European Search Report for European Application No. 17162289.7, dated Aug. 31, 2017, 7 pages.
Extended European Search Report for European Application No. 18738547.1, dated Sep. 24, 2020, 9 pages.
Extended European Search Report for European Application No. 18738743.6, dated Sep. 24, 2020, 11 pages.
High Tech Products, Inc., "Human Contain Model X-10 Rechargeable Multi-function Electronic Dog Fence Ultra-system," Internet citation, Retrieved from the Internet: URL: http://web.archive.org/web/20120112221915/http://hightechpet.com/user_Manuals/HC%20X-10_Press.pdf [retrieved on Apr. 10, 2017], Apr. 28, 2012, pp. 1-32, XP008184171.
Info Unlimited "Canine 10RC-HP10 Instructions"; Instruction manual V.0420; Publication 12 & 15 [online]. Jun. 14, 2013 [retrieved Sep. 29, 2020]. Retrieved from the Internet: URL: https://www.amazing1.com/content/download/CANINE10_Instructions.pdf.
International Search Report and Written Opinion for Application No. PCT/US2020/042601, dated Nov. 9, 2020, 11 pages.
International Preliminary Report for Patentability Chapter II for International Application No. PCT/US2014/024875, dated Mar. 12, 2015, 17 pages.
International Preliminary Report on Patentability for Application No. PCT/US2015/043653, dated Dec. 19, 2017, 14 pages.
International Search Report and Written Opinion for Application No. PCT/US2018/013737, dated Mar. 7, 2018, 8 pages.
International Search Report and Written Opinion for Application No. PCT/US2018/013738, dated Mar. 20, 2018, 6 pages.
International Search Report and Written Opinion for Application No. PCT/US2018/013740, dated Mar. 20, 2018, 6 pages.
International Search Report and Written Opinion for Application No. PCT/US2018/019887, dated May 8, 2018, 10 pages.
International Search Report and Written Opinion for Application No. PCT/US2018/065122, dated Mar. 25, 2019, 7 pages.
International Search Report and Written Opinion for Application No. PCT/US2018/065154, dated Apr. 23, 2019, 7 pages.
International Search Report and Written Opinion for Application No. PCT/US2018/065938, dated Mar. 8, 2019, 9 pages.
International Search Report and Written Opinion for Application No. PCT/US2020/016617, dated Apr. 27, 2020, 13 pages.
International Search Report and Written Opinion for International Application No. PCT/US2014/024875, dated Jun. 27, 2014, 12 pages.
International Search Report for International Application No. PCT/US2014/020344, dated Jun. 5, 2014, 2 pages.
International Search Report for International Application No. PCT/US2014/066650, dated Feb. 19, 2015, 3 pages (Outgoing).
International Search Report for International Application No. PCT/US2015/010864, Form PCT/ISA/210 dated Apr. 13, 2015, 2 pages.
International Search Report for International Application No. PCT/US2015/043653, Form PCT/ISA/210 dated Oct. 23, 2015, 2 pages.
Jondhale S. R., et al., "Issues and Challenges in RSSI Based Target Localization and Tracking in Wireless Sensor Networks," International Conference on Automatic Centrol and Dynamic Optimization Techniques (ICACDOT),2016, pp. 594-598.
Joshi A., et al., "GPS-less Animal Tracking System," Fourth International Conference on Wireless Communication and Sensor Networks,2008, pp. 120-125.
Kuo S., et al., "Detecting Movement of Beacons in Location-Tracking Wireless Sensor Networks," IEEE 66th Vehicular Technology Conference, 2007, pp. 362-366.
Kuo S., et al., "The Beacon Movement Detection Problem in Wireless Sensor Networks for Localization Applications," IEEE Transactions on Mobile Computing, Oct. 2009, vol. 8(10), pp. 1326-1338.
Millner H., et al., "Wireless 3D Localization of Animals for Trait and Behavior Analysis in Indoor & Outdoor Areas," IEEE MTT-S International Microwave Workshop on Wireless Sensing, Local Positioning, and RFID, 2009, pp. 1-4.
Notification of Transmittal of the International Search Report and the Written Opinion of the International Searching Authority for International Application No. PCT/US2015/043653, Form PCT/ISA/220 dated Oct. 23, 2015, 1 page.
Notification of Transmittal of the International Search Report and Written Opinion for the International Application No. PCT/US2014/066650, dated Feb. 19, 2015, 1 page.
Panicker, G. J., et al., "A LoRa Wireless Mesh Network for Wide-Area Animal Tracking," IEEE International Conference on Electrical, Computer and Communication Technologies,2019, pp. 1-5.
Welch G., et al., "An Introduction to the Kalman Filter," Department of Computer Science, Jul. 24, 2006, pp. 1-16.
Written Opinion for International Application No. PCT/US2014/066650, dated Feb. 19, 2015, 15 pages(outgoing).
Written Opinion for International Application No. PCT/US2015/043653, Form PCT/ISA/237 dated Oct. 23, 2015, 13 pages.
Written Opinion of the International Application No. PCT/US2015/010864, Form PCT/ISA/237 dated Apr. 13, 2015, 6 pages.

* cited by examiner

US 11,238,889 B2

SYSTEMS AND METHODS FOR REMOTE MULTI-DIRECTIONAL BARK DETERRENCE

RELATED APPLICATIONS

Not applicable

TECHNICAL FIELD

The disclosure herein involves monitoring and deterring noise disturbances generated by an animal.

BACKGROUND

A dog may from time to time generate noise disturbances including barking episodes. Bark deterrence systems often use delivery of sound stimulus to deter this unwanted behavior.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1:
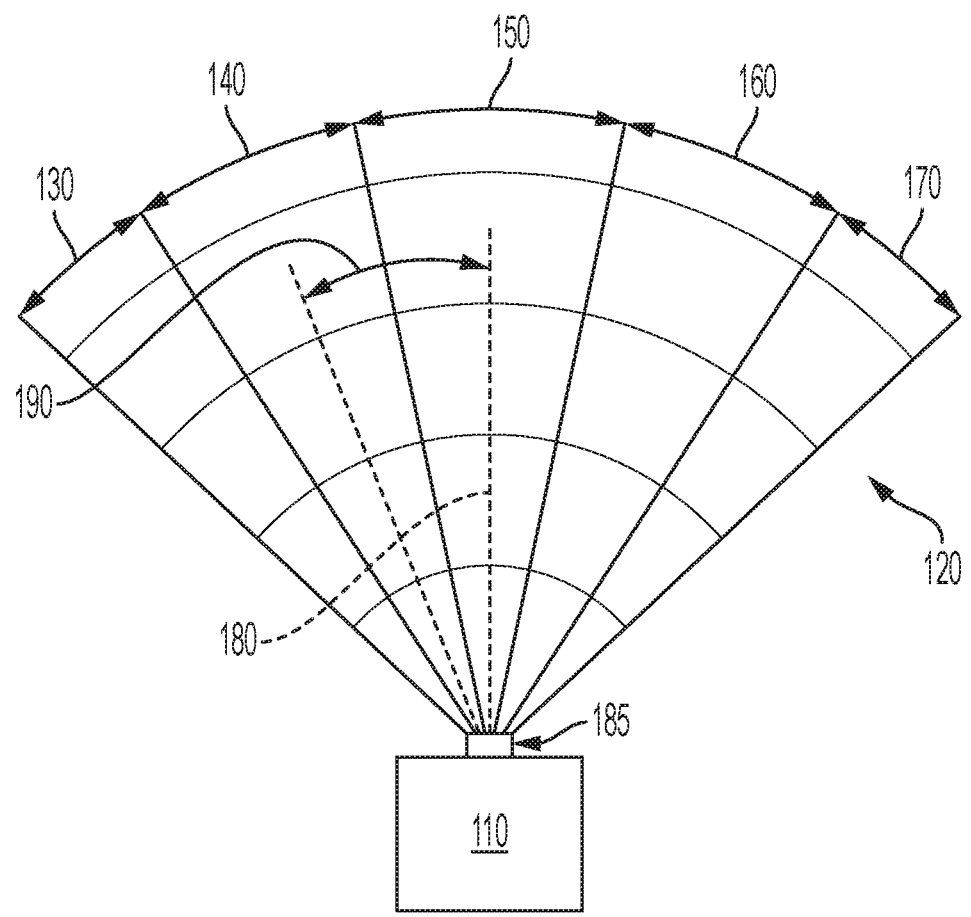
FIG. 1 shows a beam spread of an ultrasonic transducer, under an embodiment.

Remote bark deterrent technology may incorporate a bark detect component responsible for detecting the occurrence of a dog bark and a correction component responsible for providing a stimulus to the dog when the bark detection component indicates an occurrence of a bark event. The stimulus discourages present and potentially future bark episodes. The bark detect and correction component may be combined into an integral bark detection and correction unit as further described herein.

The bark detect component may comprise a microphone (or microphone array) for analyzing one or more of audio frequency spectrum, sound pressure level (audio magnitude), and audio signature. These concepts are further described below.

An audio frequency or audible frequency is a periodic vibration whose frequency is in the band audible to the average human. The SI unit of audio frequency is the hertz (Hz). It is the property of sound that most determines pitch. The generally accepted standard range of audible frequencies for humans is 20 to 20,000 Hz, although the range of frequencies individuals hear is greatly influenced by environmental factors. In air at atmospheric pressure, these represent sound waves with wavelengths of 17 meters (56 ft) to 1.7 centimeters (0.67 in). Frequencies below 20 Hz are generally felt rather than heard, assuming the amplitude of the vibration is great enough. High frequencies are the first to be affected by hearing loss due to age or prolonged exposure to very loud noises.

Sound pressure or acoustic pressure is the local pressure deviation from the ambient (average or equilibrium) atmospheric pressure, caused by a sound wave. In air, sound pressure can be measured using a microphone. Sound pressure, like other kinds of pressure, is commonly measured in units of Pascals (Pa). The quietest sound that most people can hear has a sound pressure of $2 \times 10^{-5}$ Pa, so this pressure is called the threshold of human hearing.

Sound pressure level (SPL) uses a logarithmic scale to represent the sound pressure of a sound relative to a reference pressure. The reference sound pressure is typically the threshold of human hearing: remember that it's $2 \times 10^5$ Pa. Sound pressure level is measured in units of decibels (dB) and is calculated using the following equation, where p is the sound pressure of the sound wave and $p_o$ is the reference sound pressure:

$$L_p = 20 \log_{10}\left(\frac{p}{p_0}\right) \text{dB}$$

An audio signature comprises characteristics of an audio signal that may be interpreted as a bark event. Bark detection may be as simple as detection of sound pressure level (dB) in certain frequency ranges. For example, the detection of energy within the frequency range of 140 Hz and 2000 Hz with a SPL above 60 dB. An embodiment may add a time component to the combination of frequency and sound pressure level. Under this embodiment, a signature comprises a combination of frequency and signal pressure level analysis over a period of time. For example, the detection of energy within the frequency range of 140 Hz and 2000 Hz, with a SPL above 60 dB, within at least three 16 millisecond periods within any ten contiguous 16 millisecond periods.

As indicated above, remote bark deterrent technology may incorporate a correction component responsible for providing a stimulus to the dog when the bark detect component indicates an occurrence of a bark event. The stimulus of course discourages present and potentially future bark episodes. The correction component typically involves a sound generation device, under an embodiment. The sound may be generated in the audible region via audio circuitry connected to a speaker or in the ultrasonic region via ultrasonic drive circuitry connected to an ultrasonic transducer.

Ultrasonic transducers convert alternating current (AC) into ultrasound, as well as the reverse. Ultrasonics typically refers to piezoelectric transducers or capacitive transducers. Piezoelectric crystals change size and shape when a voltage is applied: AC voltage makes them oscillate at the same frequency and produce ultrasonic sound. Capacitive transducers use electrostatic fields between a conductive diaphragm and a backing plate.

As indicated above, one type of ultrasonic transducer comprises the piezoelectric crystal, which converts an oscillating electric field applied to the crystal into a mechanical vibration. Piezoelectric crystals may include quartz, Rochelle salt, certain types of ceramic, etc. Piezoelectric transducers may be employed over the entire frequency range and at all output levels.

The sound generated by a correction component may be in the audible region or ultrasonic region. Some audible sounds are effective at distracting a barking dog such as white noise (white noise is a sound that contains every frequency within the range of human hearing; generally from 20 hertz to 20 kHz in equal amounts), the owner's voice, and/or the sound of coins shaking in a can. To obtain a response from a dog while not disturbing people, the ultrasonic region may be chosen, under an embodiment. The ultrasonic frequencies are heard by dogs but not typically heard by humans. The frequencies chosen are under one embodiment in the 20 kHz to 27 kHz range. Also, frequencies up to 50 kHz may be heard by dogs and may be utilized. Sound pressure level increases as amplitude of the ultrasonic signal increases. Under one embodiment acoustic power is maximized for efficacy but only to the point where the maximum sound pressure level at the dog's ears is less than or equal a value determined to be safe for the dog and any human that is within the field of the ultrasonic field. Ultrasonic frequencies and power levels are chosen under one embodiment based on the frequencies/power levels determined to be effective for a specific dog or event type. They may be determined based on a logging/learning methodology and/or based on repeat occurrences of a behavior following an ultrasonic correction. At the ear on the animal, 115 dBA may be tolerated for 15 minutes, under an embodiment. However, the scale may slide all the way to 160 dBA for 1 second. Typically correction tones are 2 seconds or less. Source sound pressure level at the face of the transducer under an embodiment is typically no more than 130 dBA. As long as the ear of a target animal is 1 meter away, this animal would experience levels significantly below 115 dBA. This also ensures safety of humans within the field of the ultrasonic signals.

The higher the frequency of the correction sound, the narrower the beam spread. (Note that beam spread is a measure of the whole angle from side to side of the main sound beam in the far field. Beam divergence is a measure of the angle from one side of the sound beam to the central axis of the beam in the far field). Therefore, the higher the frequency, the more aligned the dog must be with the correction speaker or transducer to receive a sufficient sound pressure level to distract a dog from a barking episode.

The ultrasonic frequencies especially suffer from this phenomena. The maximum sound pressure level for the ultrasonic frequencies is found along the centerline (i.e., axis) of the transducer signal and then diminishes significantly as the angle from centerline increases.

The audible frequency bark itself has a wide, audible frequency, beam spread, and thus, the bark is detected by the bark detection circuitry from a wide angle in the horizontal plane. This angle is under one embodiment wider than the correction sound, especially if the correction sound is in the ultrasonic range.

In order to effectively interrupt an unwanted behavior exhibited by the dog, the sound pressure level, i.e. the correction signal, must be of a significant enough level when it reaches the dog's ears. The dog may not necessarily be aligned with the front of the speaker or transducer when the barking is detected. In other words, the bark detection component may detect a bark event but the animal may be outside the beam spread of the correction signal. The signal reaching the dog's ears may be significantly attenuated, possibly even below perception levels.

Carrying this concept to the next level, if a single bark deterrent system covers a wide region, a single fixed speaker or transducer may likely not generate enough sound pressure at every spot in the yard or indoor room to deter the barking behavior.

As indicated above, a bark detection and correction unit may comprise a bark detect component responsible for detecting the occurrence of a dog bark and a correction component for transmitting a bark correction signal. The bark correction (or deterrent) component may cover a wider angular region of the horizontal plane in order to optimize delivery of sound pressure levels to animals upon detection of a bark event. In other words, a wider angular correction region increases the chances of delivering sufficient sound energy, i.e. sound pressure level, to a dog's ears. The bark detection component may detect a direction of an incoming bark event and provide information to the bark correction component for activating a plurality of transducers that emit signals covering wide angular regions, for selecting a specific transducer that transmits a bark deterrent signal in the direction of the animal, and/or for rotating one or more transduces to direct their beam spread regions in a direction of the animal.

FIG. 1 shows a bark detection and correction unit 110. The unit comprises an ultrasonic transducer 185 that emits an ultrasonic signal. FIG. 1 shows the ultrasonic beam spread. The beam spread comprises regions 130, 140, 150, 160, 170. Note that sound pressure level is greatest along the central axis 180 of a beam spread and dissipates as the angle 190 from central axis 180 increases. Therefore the beam spread comprises the following regions: strongest perception region 150; weaker perception regions 140, 160; and lowest perception regions 130, 170. The correction signal is more likely to reach and deter the barking behavior of an animal in region 150 version region 170.

Figure 2:
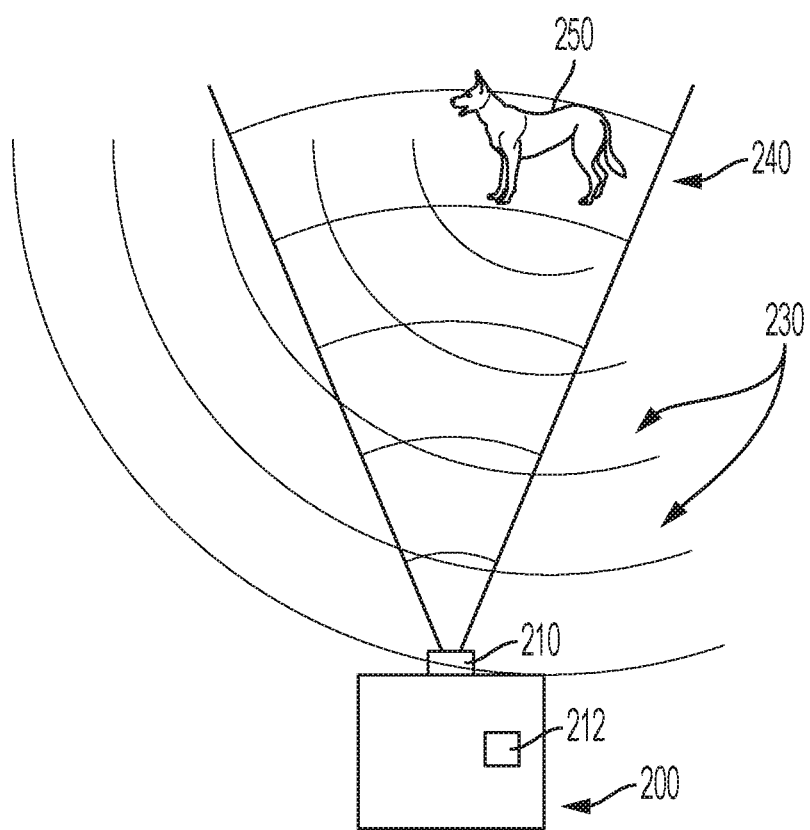
FIG. 2 shows delivery of an ultrasonic signal to an animal, under an embodiment.

FIG. 2 shows a bark detection and correction unit 200. The unit comprises an ultrasonic transducer 210 that emits an ultrasonic signal. The unit also comprises a bark detection sensor 212 (which may be located at any position on the unit for detecting audible sound in the broadest possible range around the unit). Under one embodiment, the transducer and sensor may comprise a common component.

The sensor may comprise a microphone which is itself a transducer that converts sound into an electrical signal. Several different types of microphone may be used for implementing bark sensing methods described herein. The different types of microphone employ different methods for converting the air pressure variations of a sound wave to an electrical signal.

Under one embodiment, a detection sensor microphone comprises a MEMS (MicroElectrical-Mechanical System) microphone (also called a microphone chip or silicon microphone). A pressure-sensitive diaphragm is etched directly into a silicon wafer by MEMS processing techniques, and is usually accompanied with integrated preamplifier. Most MEMS microphones are variants of a condenser microphone design. Under an embodiment, digital MEMS microphones have built in analog-to-digital converter (ADC) circuits on the same CMOS chip making the chip a digital microphone and so more readily integrated with modern digital products.

Under one embodiment, a detection sensor microphone comprises a piezoelectric ultrasonic transducer for detecting the vibration of the bark. A piezoelectric sensor is a device that uses the piezoelectric effect to measure changes in pressure by converting them to an electrical charge.

With continued reference to FIG. 2, the bark detection sensor detects sound waves 230 of a bark event. In response, the transducer emits an ultrasonic signal with beam spread 240. As the dog 250 is located directly in the path of the beam spread, the sound pressure level of the ultrasonic correction sound is likely sufficient to command attention of the animal and deter barking.

Figure 3:
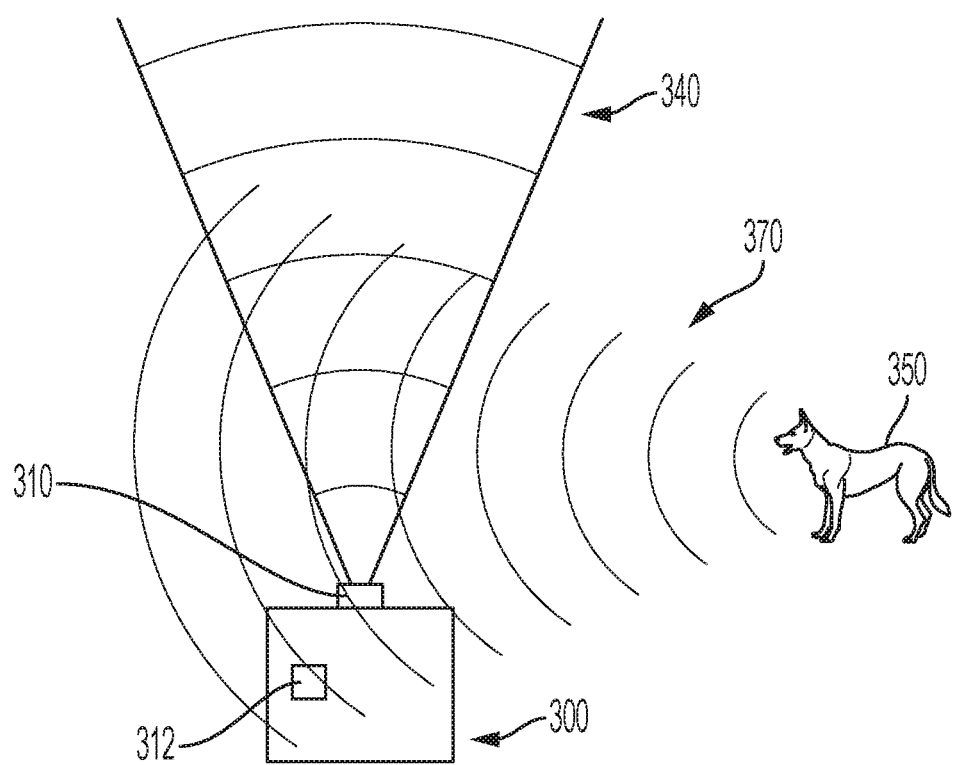
FIG. 3 shows an animal outside the coverage of an ultrasonic signal, under an embodiment.

FIG. 3 shows a bark detection and correction unit 300. The unit comprises an ultrasonic transducer 310. The unit also comprises a bark detection sensor 312 (which may be located at any position on the unit for detecting audible sound in the broadest possible range around the unit). Under one embodiment, the transducer and sensor may comprise a common component. The bark detection sensor detects sound waves of a bark event. In response, the transducer emits an ultrasonic signal with beam spread 340. As the dog 350 is located outside the path of the beam spread 340, the sound pressure reaching the animal is very low and very unlikely to influence animal behavior.

Figure 4:
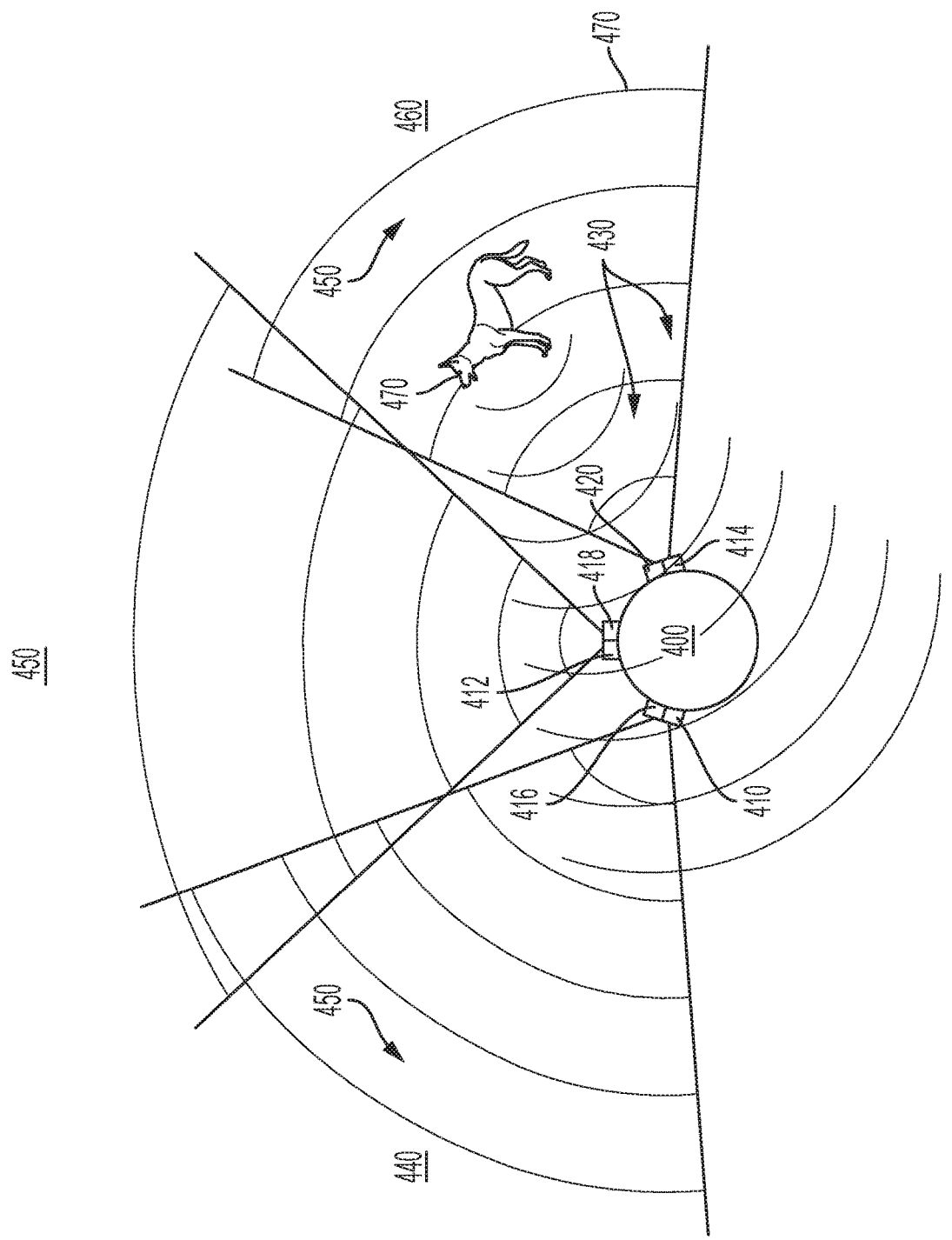
FIG. 4 shows a detection and correction unit, under an embodiment.

FIG. 4 shows a bark detection and correction unit 400. The unit comprises ultrasonic transducers 410, 412, 420. The unit also comprises bark detection sensors 416, 418, 414. The transducer/sensor pairs (as seen in FIG. 4) may comprise combined transducer/sensor components or discrete components paired at common locations of the bark detection and correction unit 400. (Under an embodiment, the detection sensors may be located at any position on the unit for detecting audible sound in the broadest possible range around the unit). One or more of the bark detection sensors detects sound waves 430 of a bark event. In response, the transducers 410, 412, 420 emit an ultrasonic signal with corresponding beam spread regions 440, 450, 460. As the dog 470 is located directly in the path of the beam spread 460, the sound pressure level of the ultrasonic correction sound is likely sufficient to command attention of the animal and deter barking.

The embodiment of FIG. 4 effectively monitors approximately a 180 degree range comprising beam spread regions 440, 450, 460. Irrespective of the animal's location in this 180 degree region, one or more of the bark sensors detect a bark event. For example, the animal 470 may be located in region 440 in close proximity to region 450. As the animal approaches region 450 (but while still located in region 440), the animal may begin barking. As long as the bark event is detectable by at least one of the sensors 416, 418, 414, detection then triggers operation of all transducers 410, 412, 414. Assume that the bark event is only detected by microphone 416. Nevertheless, all transducers operate simultaneously to produce overlapping beam spread regions that span approximately 180 degrees. Even if the animal accelerated into region 450 and then region 460, an effective ultrasonic signal reaches the animal.

Figure 5:
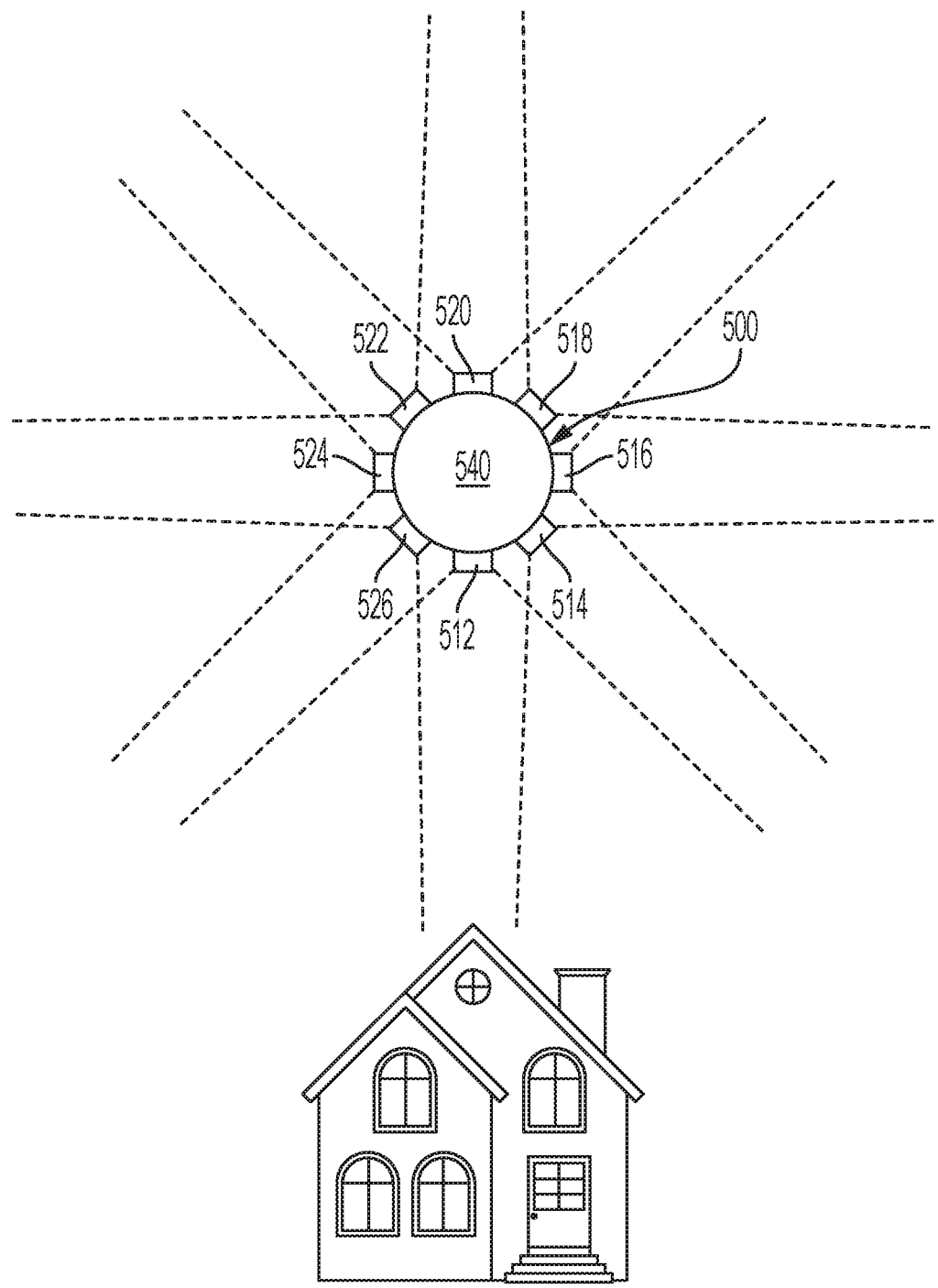
FIG. 5 shows beam spread regions of transducers located on a detection and correction unit, under an embodiment.

FIG. 5 shows a bark detection and correction unit 500. The unit 500 comprises eight correction units 512, 514, 516, 518, 520, 522, 524, 526. Each correction unit comprises an ultrasonic transducer. The correction units may include detection sensors for detecting bark events. Alternatively, one or more detection sensors may be placed at any other location on bark detection and correction unit 500 for detecting audible sound in the broadest possible range around the unit. As just one example, a sensor 540 may be located at a highest point (or other location) enabling detection of bark events from any direction. The combined beam spread of the transducers covers a 360 degree range around the unit 500. One or more sensors may detect a bark event anywhere in the detection region and trigger operation of all transducers. The resulting signal is then directed toward the animal irrespective of its position. Of course, fewer than eight transducers may be used to cover the 360 degree range correction region.

Figure 6:
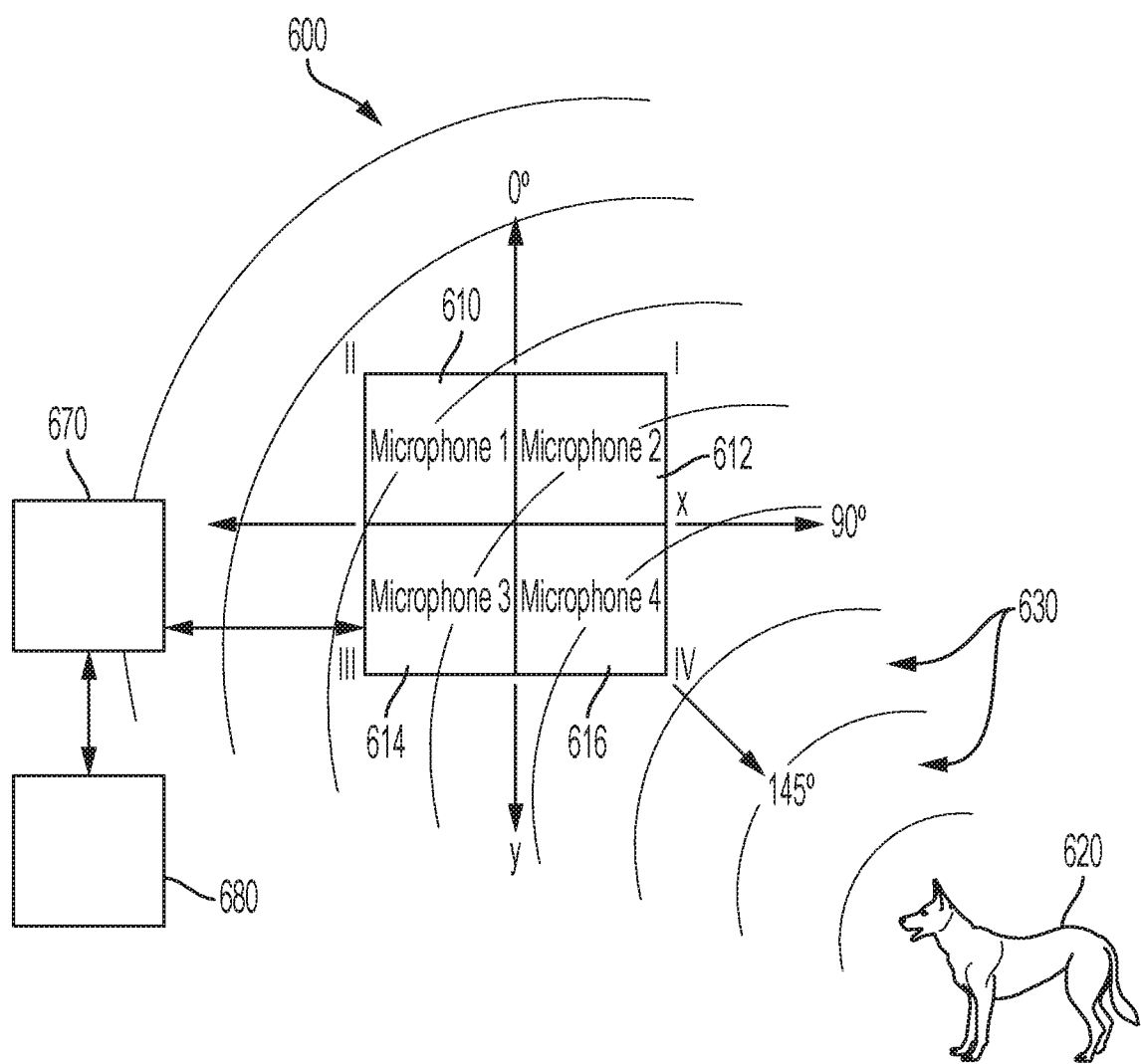
FIG. 6 shows a microphone array, under an embodiment.
Figure 7:
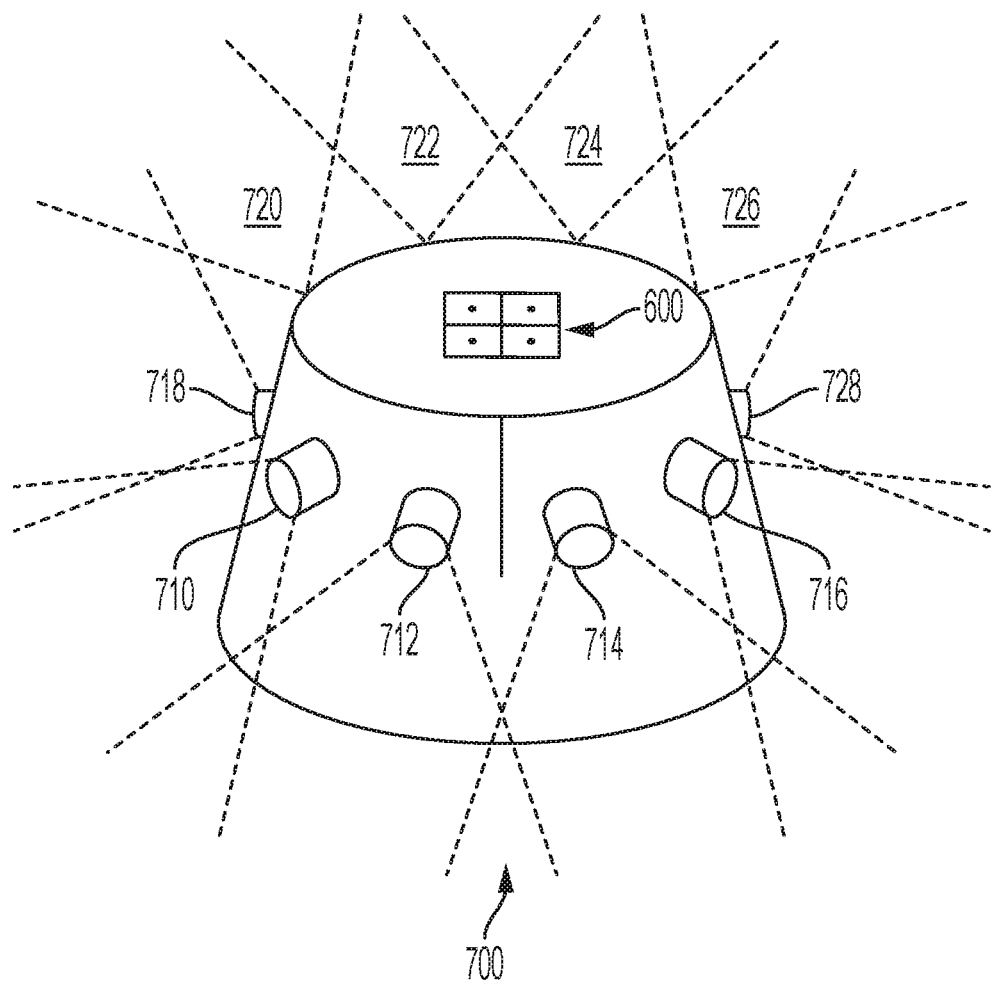
FIG. 7 shows a detection and correction unit, under an embodiment.

FIG. 6 shows four microphone sensors 610, 612, 614, 616 configured as a microphone array 600 for use in detecting bark events. Assuming a Cartesian coordinate system imposed on the microphone array as seen in FIG. 6, microphone 612 is located in region I, microphone 610 is located in region II, microphone 614 is located in region III, and microphone 616 is located in region IV. The microphone array may be placed on a bark detection and correction unit as seen in FIG. 7. The microphones illustrated in FIG. 6 detect sound waves 630 of animal 620. The microphone array is coupled to an analog to digital converter 670 which is further coupled to at least one processor 680. The microphone array, analog to digital converter, and processor are also communicatively coupled with transducers located on a bark detection and correction unit under an embodiment. The microphones receive information of the audible bark event including arrival time, phase, and magnitude at the respective microphone. This information is passed through the analog to digital converter 670 to processer 680. (As indicated above, one or more microphones may include analog-to-digital converter (ADC) circuits). Based on arrival time, phase difference, and/or signal magnitude, the processor determines the bearing to the dog relative to the position of the microphone array and therefore relative to a bark detection and correction unit using the array for detection purposes. Methods for determining the bearing from a microphone array to a sound source are further described below. The processor also uses information of the audible bark event to confirm that the audible event is in fact a bark. Methods for detecting bark events are also further described below.

Once the bark sound is confirmed to be valid, and bearing from the unit to the pet is known, the processor 680 can easily determine, via lookup table, the proper single or multiple transducers to utilize in directing the maximum SPL to the bearing angle. The detected bearing angle may comprise a positive rotation from a zero degree reference line (as further described below). The lookup table may include bearing information for each transducer, i.e. bearing information for each respective beam axis relative to such zero degree reference line. Upon detecting a bearing to a barking animal, the lookup table may be used to select one or more transducer(s) most aligned (plus or minus a threshold degree range) with the detected bearing.

FIG. 7 shows a bark detection and correction unit 700, under an embodiment. The unit includes a microphone array 600 (as seen in FIG. 6) on a top surface of the unit. The microphone array is also coupled to an analog to digital converter 670 which is also coupled to a processor 680 (also shown in FIG. 6). The unit 700 includes a plurality of ultrasonic transducers 710, 712, 714, 716, 718, 728 and corresponding beam spread regions. FIG. 7 illustrates additional beam spread regions 720, 722, 724, 726 emanating from additional ultrasonic transducers (not shown) surrounding the bark detection and correction unit 700. An animal within a monitored region corresponding to the combined span of the beam spread regions seen in FIG. 7 may bark producing sound waves that arrive at the microphone array. Under an embodiment, the microphone array may detect signals corresponding to the bark event and determine a location of the animal relative to the microphone array and relative to the ultrasonic transducers positioned around the upper periphery of the bark detection and correction unit 700.

As indicated, the microphone array 600 and processor 680 determine location of the animal relative to the unit using one or more location methods (further described below). The processor then uses information of the location and a lookup table to select the transducer or transducers (and corresponding beam spread coverage) most aligned with the bearing of the animal, i.e. to select the transducer(s) capable of delivering maximum sound pressure level to the source. Under one embodiment, the unit 700 may then identify an additional transducer or transducers on either side of the previously selected transducer(s). The bark detection and correction unit 700 then transmits a correction signal using the selected transducer and any additional transducers. Under an embodiment, bark detection may continue during the correction phase. If a new bearing of the animal is determined, the processor may identify transducers for delivery of a correction signal in the same manner as described above. If the newly identified transducers are the same as the previously identified transducers, then the detection and correction unit may simply continue the correction signal. If the newly identified set of transducers is entirely different than previously identified set, then detection and correction unit may use the new set to deliver a correction signal. If the newly identified set of transducers partially overlaps with the previously identified set, then the detection and correction unit may simply initiate use of the additionally identified transducers (cumulative of operational transducers) in delivering a correction signal.

Figure 8A:
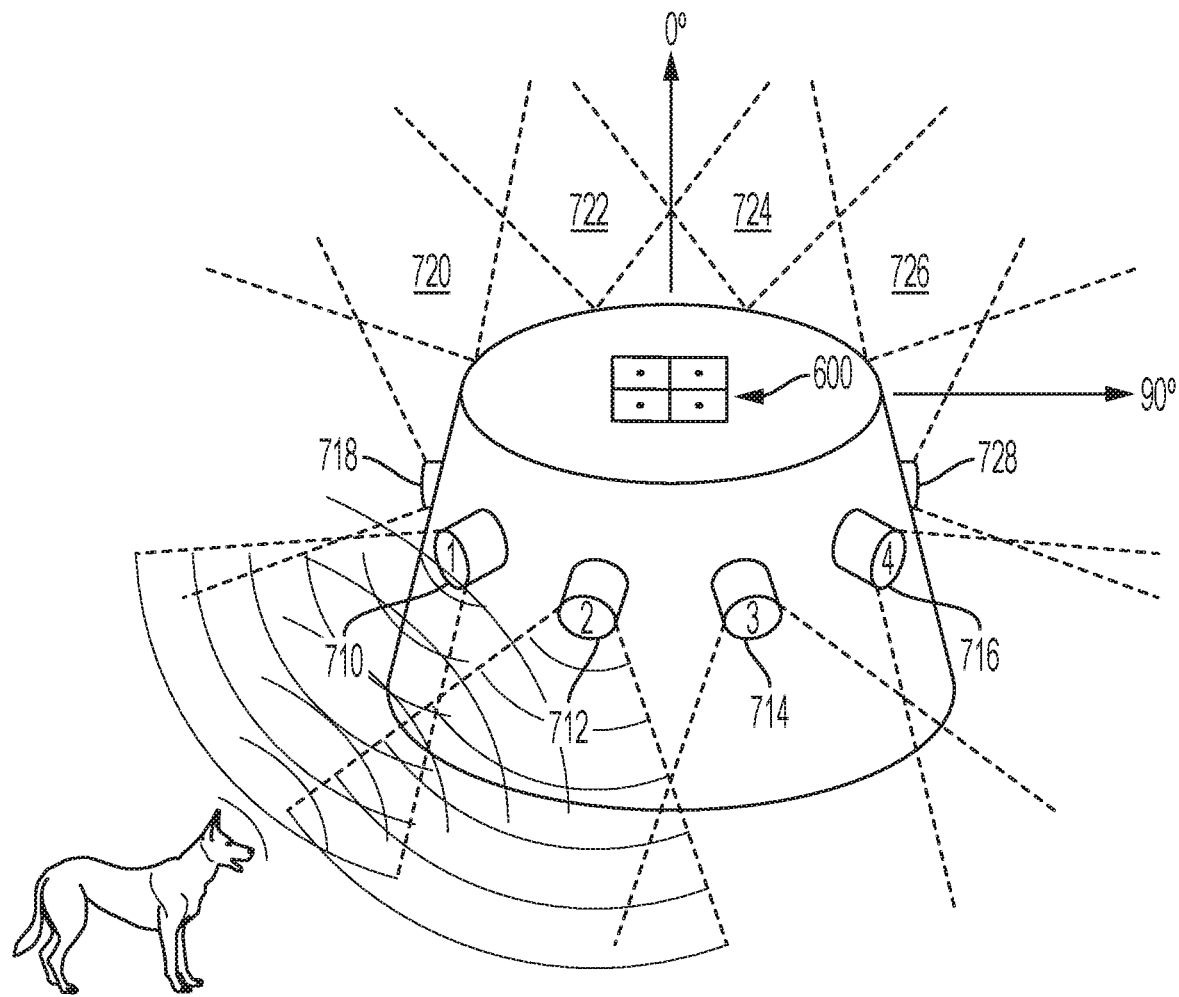
FIG. 8A shows a detection and correction unit, under an embodiment.
Figure 8B:
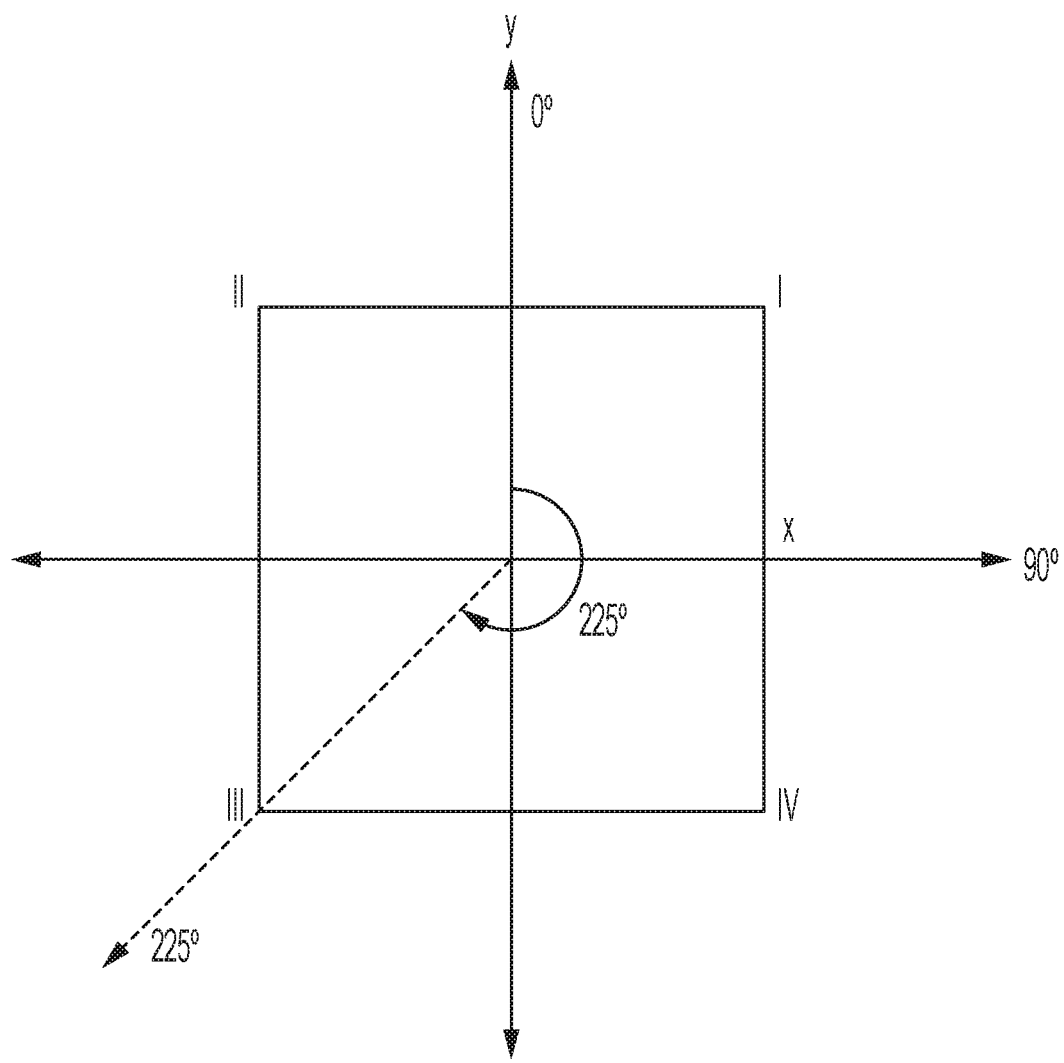
FIG. 8B shows a bearing of an animal relative to a detection and correction unit, under an embodiment.

FIG. 8A provides the same bark detection and correction unit as displayed in FIG. 7 and already described above. An animal in a proximity to the bark detection and correction unit may begin barking producing a sound wave which approaches microphone array 600. The microphone array 600 and processor 680 determine location of the animal relative to the unit using one or more of the location methods further described below. The processor may determine a bearing of 225 degrees. In other words, the animal is positioned along a line corresponding to a 225 degree positive rotation from a zero degree reference line. (FIG. 8B shows the bearing according the geometry of the microphone array described in FIG. 6). The processor then uses information of the location and a lookup table to select the transducer or transducers (and corresponding beam spread coverage) most aligned with the bearing of the animal, i.e. to select the transducer(s) capable of delivering maximum sound pressure level to the source. In the example of FIG. 8A, the processor selects transducers 710, 712 for delivering a correction signal.

Figure 9:
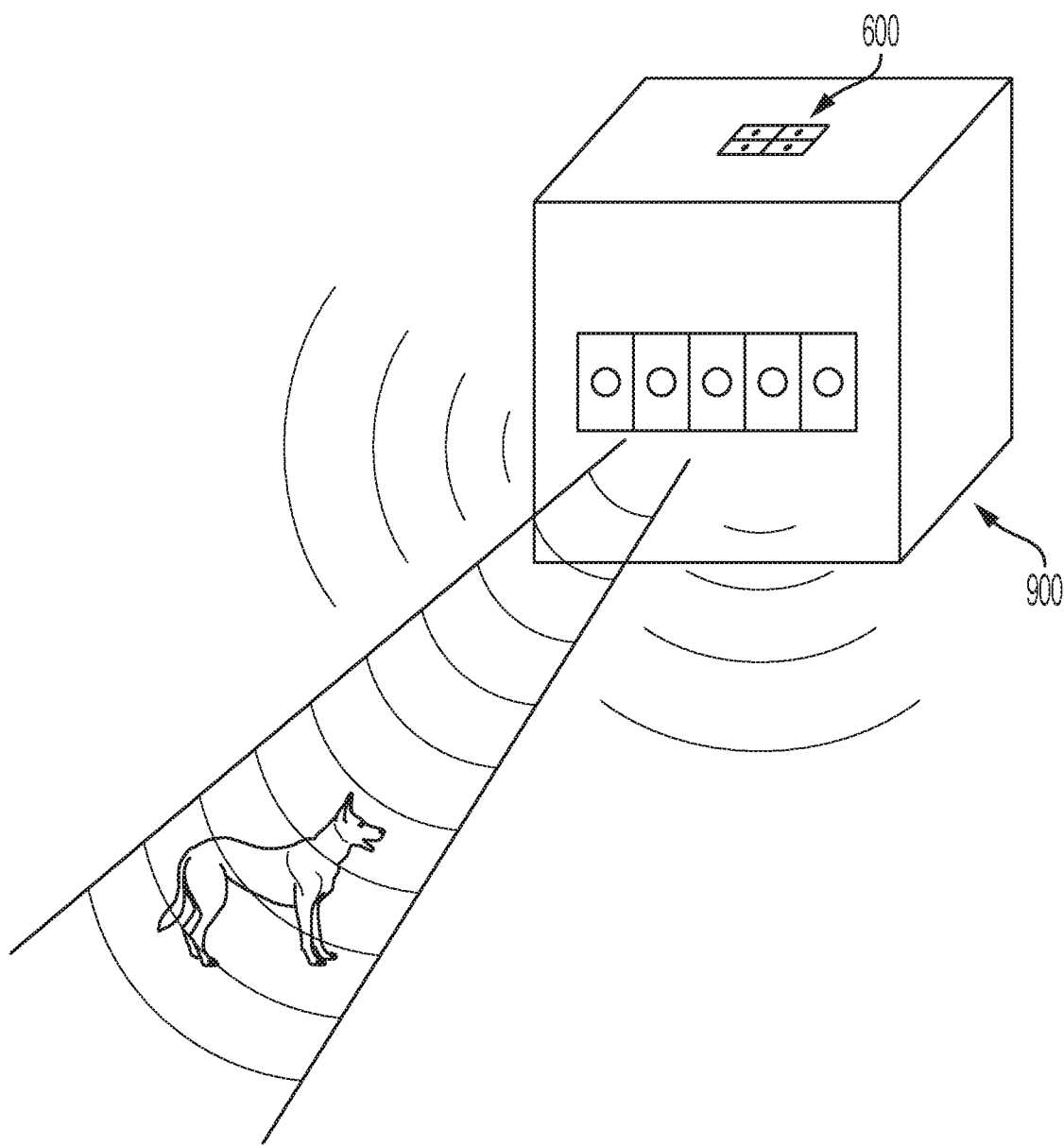
FIG. 9 shows a detection and correction unit, under an embodiment.

FIG. 9 shows a bark detection and correction unit 900, under an embodiment. The embodiment of FIG. 9 features a rectangular prism. The unit includes a microphone array 600 (as seen in FIG. 6) on a top surface of the unit. The microphone array is also coupled to an analog to digital converter 670 which is also coupled to a processor 680 (also shown in FIG. 6). A front of the rectangular prism features an ultrasonic linear phased 1×5 array. In the event of a nearby bark, the microphone array and processor determine a bearing of the animal. Under the embodiment of FIG. 9, the bearing is determined to be 225 degrees (using location methods further described below). Utilizing beam forming from the multiple transducers, the correction sound is directed along the 225 degree bearing.

Under one embodiment a linear phased array as shown in FIG. 9 may deliver a correction signal. The linear phased array comprises a number of transducer elements positioned in a physical linear array. The elements are fired sequentially from one side to the other, all within a single cycle time of the driven correction signal frequency, allowing constructive interference to focus the beam along a specified bearing. Note that waves generally do not reflect when they strike other waves. Instead, they combine. If the amplitudes of two waves have the same sign (either both positive or both negative), they will add together to form a wave with a larger amplitude. This is called constructive interference. The distance between transducers, and the phase relationship of the signals driven by each transducer determine direction of the sound beam. Further, note that the linear phased array may comprise greater than or less than the five transducers shown in FIG. 9.

Figure 10:
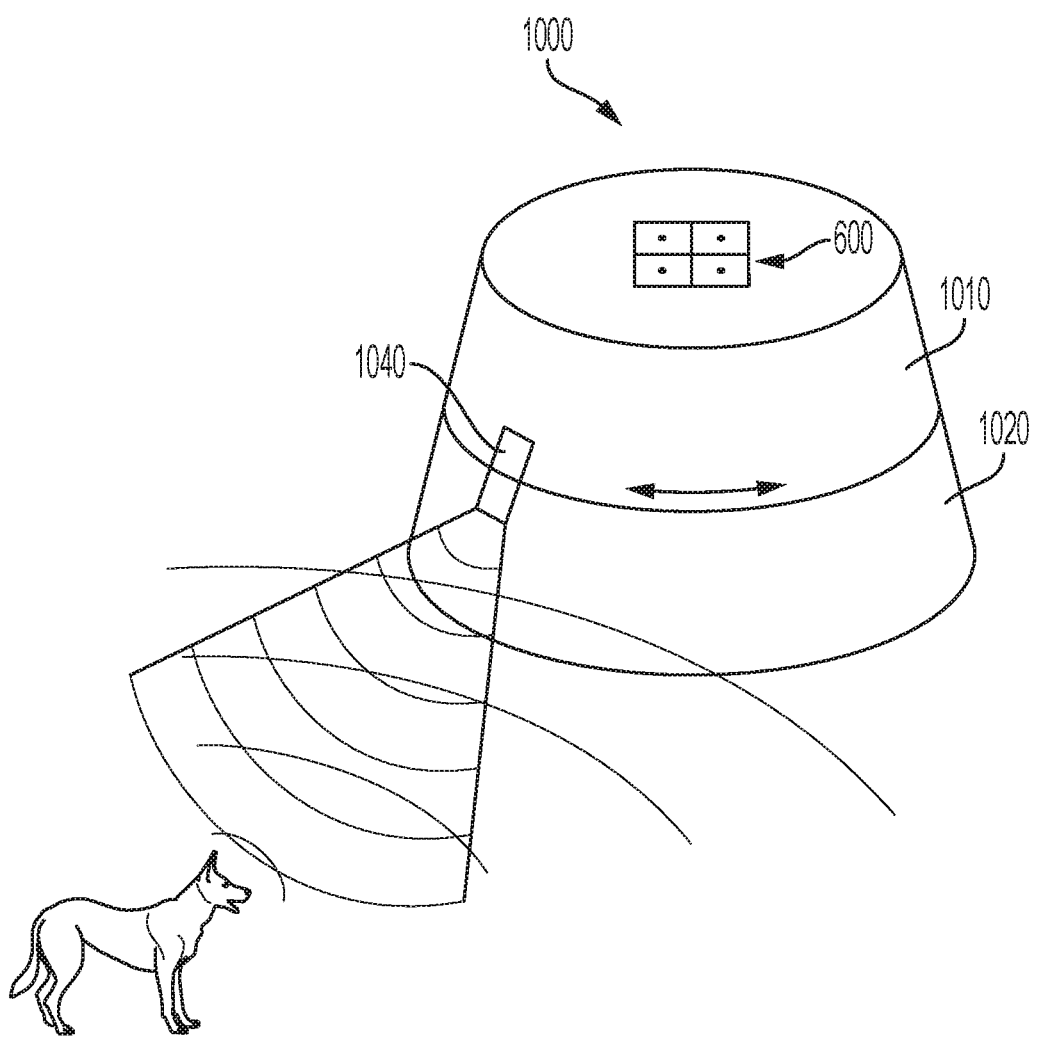
FIG. 10 shows a detection and correction unit, under an embodiment.

FIG. 10 shows a bark detection and correction unit 1000, under an embodiment. The embodiment of FIG. 10 features a unit in the shape of a conical tower. The unit includes a microphone array 600 (as seen in FIG. 6) on a top surface of the unit. The microphone array is also coupled to an analog to digital converter 670 which is also coupled to a processor 680 (also shown in FIG. 6). A top portion 1010 of the detection and correction unit is rotatably coupled to a lower portion 1020. A rotation of the top portion also rotates a position of an ultrasonic transducer 1040 around the periphery of the unit. The transducer may be rotated to any position along a 360 degree path around the exterior of the unit. Under one embodiment, the bearing of a barking animal is determined to be 225 degrees (using location methods described below). The transducer is then rotated to deliver an ultrasonic signal with a beam spread axis aligned along the 225 degree bearing. Note that the embodiment of FIG. 10 may comprise multiple transducers. As one example, multiple transducers may be equally spaced around a periphery of the unit. The processor 680 may use information of the bearing and information of transducer location (available via lookup table) to rotate the transducers in a direction (clockwise or counterclockwise) that positions a transducer (or transducers) for operation with the least amount of rotation.

One or more applications may run on the processor described above for (i) determining effectiveness of a driven correction sound based on time between barking episodes; (ii) changing the correction sound when a driven correction sound is determined to be ineffective, i.e. the dog continues to bark; and/or (iii) improving detection of bark sounds and rejection of non-bark sounds.

The processor monitors and analyzes the bark events, under an embodiment. Based on the bark (or even bark type as further described below) and repeat episode timing or sequence, the correction sound can be found to be effective or ineffective.

An example is as follows:
A. Detect bark.
B. Drive a frequency range with a specific on/off pattern as a deterrent for a period of time. Under an embodiment ultrasonic products drive fixed-amplitude chirps or signals from about 22 kHz to 27 kHz at varying time intervals including time intervals ranging from 600 milliseconds to 4 seconds. These fixed amplitude chirps/signals may under an embodiment start at 22 kHz and rise to 27 kHz within the correction period. Under an alternative embodiment, these fixed amplitude chirps/signals may start at 37 kHz and rise to 42 kHz within the correction period.

C. Monitor for a repeat bark event for a period of time.

D. If the period of time shows a continuation of the same barking episode (i.e. repeats within 5 seconds), the chosen frequency range and specific on/off pattern can be repeated.

E. If A-D occurs more than a pre-determined number of times a new frequency range and specific on/off pattern can be driven.

Repeating A to E.

Systems and methods for detecting bark events are set forth in U.S. patent application Ser. No. 15/871,846, filed Jan. 15, 2018, which application is incorporated herein by reference as if set forth herein in its entirety. Bark detection methods of a bark detection and correction unit are further described below.

Note that the microphone array of a bark detection and correction unit may be coupled to a front end filter controlled by firmware running on one or more processors as further described below. Further, the bark detection methods described below incorporate power saving functionality by scheduling detection tests to terminate a detection process early when the sound event clearly fails to qualify as a bark.

The electrical signals provided by a microphone array's detection of a nearby sound event is processed through a series of three analog operational amplifier stages. Stage one provides buffering and a ~160 Hz high pass filter. The filter eliminates low frequency content of the signals that are primarily created from (non-bark) activity. Stage two provides unity gain with variable attenuation that is updated and controlled by the bark detection algorithm firmware. If the signal is found to be very large in magnitude (using most of the dynamic range of the ADC (Analog to Digital Convertor)) the signal is attenuated in the second stage in an attempt to prevent clipping of the signal (a condition in which the input signal exceeds the dynamic range of the ADC). The third stage is a fixed gain stage to increase the overall signal to optimally conform to the electrical limits of the ADC with no attenuation from stage 2. The overall set point for the gain is a function of both the mechanical and electrical characteristics of the entire system. Finally, the conditioned signals from the three stage operational amplifier AFE (analog front end) are converted to a digital equivalent by using an ADC which is used by a bark detection algorithm for bark event detection, under one embodiment. The bark detection algorithm runs on a processor as shown in FIG. 6 above.

The algorithm for bark detection analyzes the whole waveform of a sound event to accept or reject the sound event as a bark. This improves both bark detection and false (non-bark) rejection.

The bark detection algorithm samples the signals from the ADC. A number of criteria are included as part of this method of discrimination. The algorithm works to positively detect a bark event on the basis of not being rejected by the following criteria:

Too Few Timeslots—This indicates a short duration event such as a strike, a bump, or a quick scratch or scrape. The bark detection algorithm identifies these events and aborts as quickly as possible in order to conserve battery. On the other hand, if an early abort does not occur due to a short duration event, then a single trigger event can cause an increment of more than one (possibly several) of the abort causes listed below. That is, a possible bark can fail the bark validation for more than one reason.

Abort Unsaturated Timeslots—This means that the signal amplitude was too high. Too many time slots were saturated; meaning there were too few unsaturated timeslots to properly analyze the signal for a bark. When used in conjunction with the hardware attenuation (stage 2) automatic gain control very few of these aborts should occur since it results in a decrease in the overall gain.

Abort Amplitude—This means that too few timeslots met the minimum amplitude requirement.

Abort Minimum Ratio and Abort Median Ratio—These indicate that the signal had features that made it look more like a scratch or a scrape than a real bark. These tests look at the ratio of the signal's absolute average voltage to its peak-to-peak voltage in each timeslot. Under one embodiment a single finding of a low ratio in one timeslot is enough to categorize the signal as a non-bark event. Real barks tend to have a higher ratio than scrapes and scratches Abort Low Pass Minimum Ratio and Abort Low Pass Median Ratio—These are very similar to the Abort Minimum Ratio and Abort Median Ratio, except that we first low pass filter the signal in firmware before we calculate the ratio of the absolute average voltage to the peak-to-peak voltage.

Abort Spike Ratio—This indicates that the peak-to-peak amplitude of the signal in one or more timeslots exceeded the average peak-to-peak amplitude of its two neighboring timeslots by a factor of >1.75. That means that there was at least one spike in the data, and spikes of that high an amplitude are uncharacteristic of a real bark. (Real barks usually score below 1.30).

Abort Absolute Spike Ratio—This indicates that the absolute average amplitude of the signal in one or more timeslots exceeded the absolute average amplitude of its two neighboring timeslots by a factor of >1.75. That means that there was at least one spike in the data, and spikes of that high an amplitude are uncharacteristic of a real bark. (Real barks usually score below 1.30).

Historically, bark detection has used positive logic. That is, software (implementing audio signal processing through analog or digital signal processing methods) would test an arbitrary waveform and if the criteria by which the waveform is evaluated is met (was true), a correction would be invoked, with the implication that the event is a bark.

The new approach for detection described herein uses negative logic. Each waveform is evaluated by a series of "tests" to prove that the waveform is not a bark. Furthermore, multiple tests have been created to allow greater discrimination of an arbitrary waveform. If the first test is true (i.e., if first test criteria are met indicating that the waveform is not a bark) then the negative logic process may abort. However, if the first test criteria are not met, then negative logic suggests that the waveform may be a bark. Then the second test is applied. If the second test is true (i.e., if second test criteria are met indicating that the waveform is not a bark) then the negative logic process may abort. The waveform is then reevaluated by the next negative logic test. If the waveform passes through all of the tests (i.e. failing to meet test criteria), the implication is that the event was a bark. These additional tests allow greater discrimination of an event from previous designs to improve the confidence in the waveform identification since each additional test reinforces the negative logic and thus further provides that the waveform is a bark at the conclusion of all waveform test criteria.

In addition to the improved confidence in the detection algorithm, negative logic minimizes power. The order of the negative logic test criteria was chosen in such a way such that the most frequently created non-bark waveforms (those created by bumps, strikes, impacts, etc.) would be detected first (aborting any further checks for that waveform) and the unit quickly returns to a low power state.

The bark detection unit may include user selectable sensitivity ranges. The different sensitivity settings change the levels of specific negative logic tests which in turn, result in either a broader range of waveforms in which a correction will be triggered or a narrower range.

The bark detection unit can identify other dog vocalizations (whining, whimpering, moaning) to be detected/corrected in addition to barks.

The ratios and tests set forth above are applied to a waveform (potential bark event) using negative logic. The application of such method allows for multiple testing criteria to be conducted and sequenced in such a way so as to maximize battery life.

The use of ratios and tests as set forth above allows for fixed limits to be set while using a variable gain system. Without the use of ratios the limits would need to be modified every time the gain of the AFE (Acoustic Front End) is changed.

As for improving detection of bark sounds and rejection of non-bark sounds, an embodiment of the bark detection and correction unit may implement machine learning. Under an embodiment detected audio samples are compared to stored library samples. This approach allows library growth as additional audio samples (corresponding to bark events) are encountered. The library may encompass the many bark types of many different breeds. The library may include samples corresponding to "types" of bark. Using such library, bark detection may discount some bark types (i.e. a bark indicating stranger on premises) as a non-event while detecting and discouraging other bark types (i.e. a bark indicating boredom). The library may include sufficient samples from a single animal to detect whether a bark event corresponds to that animal. The library may also include samples corresponding to common sounds occurring within detection range of a bark detection and correction unit such that common sounds may be filtered.

Figure 11:
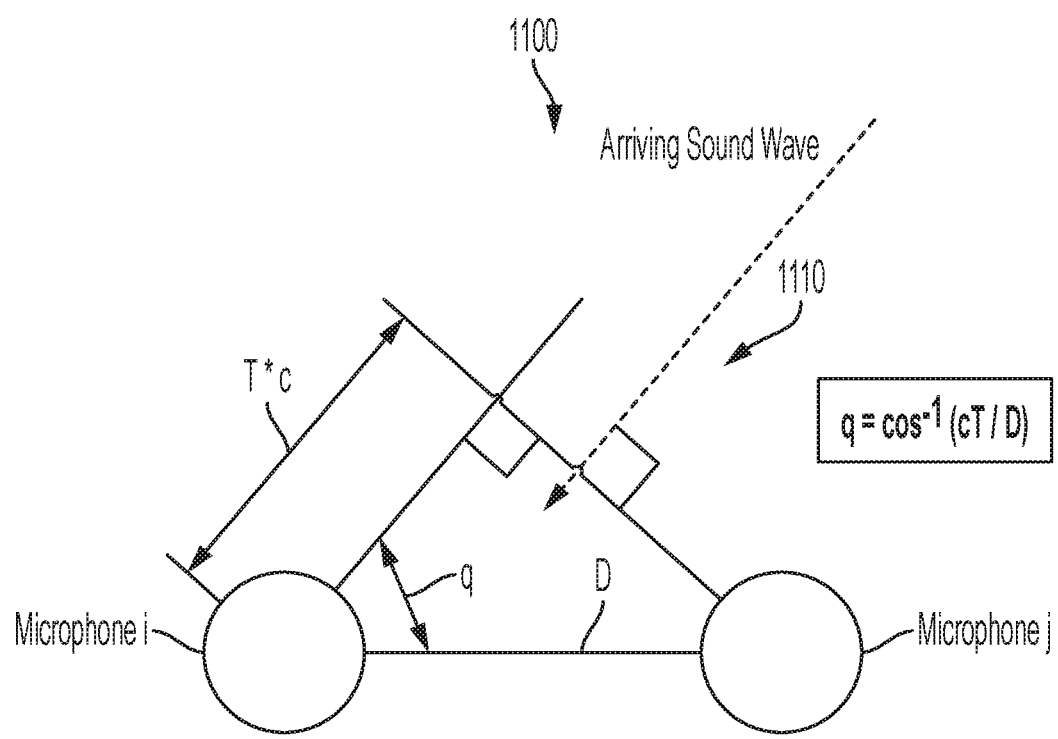
FIG. 11 shows determination of bearing, under an embodiment.

Methods for determining the bearing from a microphone array to a sound source are referenced above. The most basic approach to determine the bearing from a microphone array to a sound source is to determine the time difference of arrival of the sound as it arrives at each pair of microphones in a fixed array. FIG. 11 shows microphone array 1100 comprising microphone$_i$ and microphone$_j$. Of course, the array may include a greater number of microphones. FIG. 11 also illustrates arriving sound waves 1110. Once the time difference of arrival (T) is known for a microphone pair, the angle (q) to the sound source from each set of microphones can be calculated as follows:

$$T = \text{Arrival time difference}$$
$$c = \text{Speed of sound}$$
$$D = \text{distance between microphones}$$
$$q = \cos^{-1}\frac{cT}{D}$$

Figure 12:
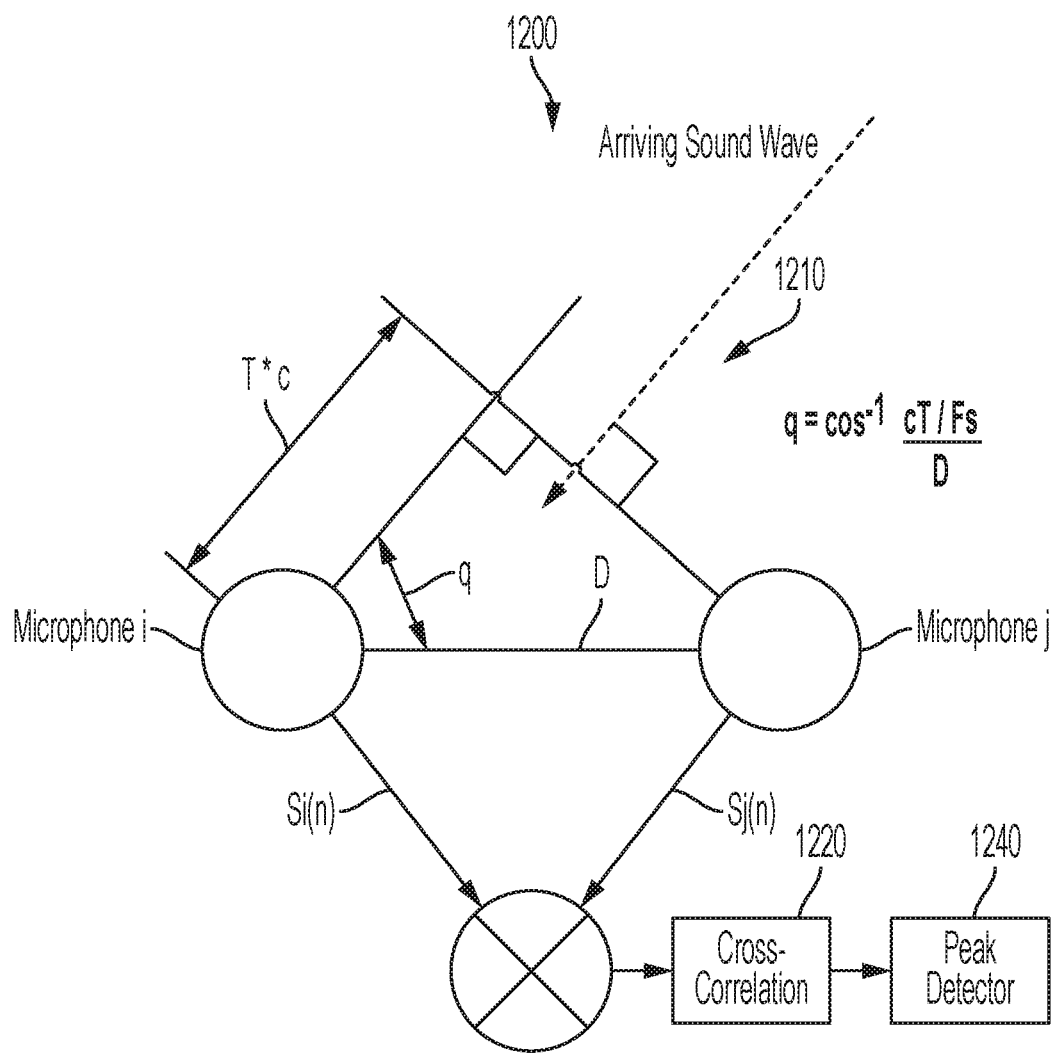
FIG. 12 shows determination of bearing, under an embodiment.

The time difference of arrival method described above can be more accurately implemented using an XCORR Cross Correlation method if the form factor of a detection and correction unit allows sufficient spacing between microphones to determine the required resolution. FIG. 12 shows microphone array 1200 comprising microphone$_i$ and microphone$_j$. Of course, the array may include a greater number of microphones. FIG. 12 also illustrates arriving sound waves 1210. To determine the time delay between microphone sets, the XCORR Cross correlation method determines the time delay utilizing the cross correlation between the received signals at the microphones. The signals from each microphone are first sampled at a sampling frequency ($F_s$) sufficient to yield the resolution required of the system. The sampled signals, i.e. the resulting digital signals $S_i$ (n) and $S_j$ (n), are then fed to a cross correlator 1220. The cross correlator output is typically then fed to a peak detector 1240. The delay time in reaching the correlation peak (signal match) determines the time difference of arrival of the sound arriving at the two microphones. This time difference is then used to determine the bearing angle (q) as follows:

$$T = \text{Number of samples to reach correlation peak}$$
$$c = \text{Speed of sound}$$
$$D = \text{Distance between microphones}$$
$$F_s = \text{Sampling frequency}$$
$$q = \cos^{-1}\frac{cT/F_s}{D}$$

The GCC-PHAT algorithm may under an embodiment be used to determine bearing from a microphone array to a sound source. It can be implemented in either the time or frequency domain. The approach also allows for microphone arrays at all spacing intervals.

The generalized cross correlation (GCC) can estimate the time delay between two microphone inputs by obtaining the inverse Fast Fourier Transform (I-FFT) of the cross-spectrum of the signals.

The phase amplitude transform (PHAT) attempts to improve the correlation by using a weighting function to obtain a unity gain for all frequency components while not affecting the phase information. The phase information yields the sound delay information. The result is a cross correlation with reduced noise.

Many other techniques may be employed to determine the bearing to an animal based on the bark sound arriving at a microphone array.

An apparatus is describe herein comprising a microphone array and a plurality of transducers, the microphone array and the plurality of transducers communicatively coupled with at least one processor, the at least one processor communicatively coupled with a memory. The microphone array is configured to receive at least one signal. Each transducer of the plurality of transducers is configured to deliver a correction signal along a transducer beam spread axis, wherein the plurality of transducers is positioned on the apparatus for providing a combined transducer beam spread coverage in the horizontal plane. One or more applications running on the at least one processor use information of the at least one signal to detect a sound event, the detecting the sound event including selecting transducers from the plurality of transducers, the detecting the sound event including instructing the selected transducers to deliver a correction signal.

The detecting the sound event includes determining a sound event bearing, wherein the sound event bearing comprises an angle from a reference line to a direction of the sound event, under an embodiment.

The determining the sound event bearing comprises using time difference of arrival of the sound event at two or more microphones of the microphone array, under an embodiment.

The determining the sound event bearing comprises cross correlating signals corresponding to the sound event received by at least two microphones of the microphone array, under an embodiment.

The determining the sound event bearing comprises using a generalized cross correlation and phase amplitude transform applied to signals corresponding to the sound event received by at least two microphones of the microphone array, under an embodiment.

The selecting the transducers from the plurality of transducers includes comparing the sound event bearing with transducer bearings of the plurality of transducers, wherein a transducer bearing comprises an angle from a respective transducer beam spread axis to the reference line, wherein the memory comprises the transducer bearings, under an embodiment.

The selecting the transducers from the plurality of transducers includes selecting the transducers when an absolute difference between the sound event bearing and respective transducer bearing is below a threshold value, under an embodiment.

The combined transducer beam spread coverage of an embodiment spans ninety (90) degrees or less.

The combined transducer beam spread coverage of an embodiment is greater than ninety (90) degrees.

The selecting the transducers from the plurality of transducers includes selecting one or more additional transducers, under an embodiment.

The one or more additional transducers of an embodiment comprise a respective beam spread axis adjacent a beam spread axis of the selected one or more transducers in the horizontal plane, wherein the selected one or more transducers comprise the one or more additional transducers.

The sound event of an embodiment comprises barking of a dog.

The plurality of transducers comprise an ultrasonic transducer, wherein the correction signal comprises an ultrasonic signal, under an embodiment.

The ultrasonic signal of an embodiment comprises a frequency range between 20 kHz and 50 kHz.

The ultrasonic signal of an embodiment comprises a sound pressure level between 70 dBA and 130 dBA measured 0.3 meters from the face of the transducer.

The reference line of an embodiment forms a fixed angle with a line connecting two microphones of the microphone array.

The reference line of an embodiment comprises magnetic north.

An apparatus is described herein comprising a microphone array and at least one transducer, the microphone array and the at least one transducer communicatively coupled with at least one processor, the at least one processor communicatively coupled with a memory. The apparatus include the microphone array for receiving at least one signal. Each transducer of the at least one transducer is configured to deliver a correction signal along a transducer beam spread axis. Each transducer of the at least one transducer is configured to rotate. One or more applications running on the at least one processor use information of the at least one signal to detect a sound event, the detecting the sound event including determining a sound event bearing, wherein the sound event bearing comprises an angle from a reference line to a direction of the sound event, the detecting the sound event including using the sound event bearing and transducer bearing information of the at least one transducer to rotate the at least one transducer, the rotating including adjusting a transducer beam spread axis of the at least one transducer to align with the sound event bearing, the detecting the sound event including instructing the at least one transducer to deliver a correction signal.

The rotating comprises rotating around a longitudinal axis of the apparatus, wherein the longitudinal axis is orthogonal to a horizontal plane, under an embodiment.

A method is described that includes under an embodiment receiving at least one signal through a microphone array. The method includes using information of the at least one signal to detect a sound event, the detecting the sound event including determining a sound event bearing, wherein the sound event bearing comprises an angle from a reference line to a direction of the sound event. The method includes selecting one or more transducers using the sound event bearing and transducer bearing information of the one or more transducers, wherein each transducer of the one or more transducers is configured to deliver a correction signal along an axis. The method includes instructing the selected one or more transducers to deliver a correction signal.

The axis of an embodiment comprises a transducer beam spread axis.

The memory of an embodiment comprises the transducer bearing information, wherein the transducer bearing information includes a transducer bearing for each transducer of the one or more transducers, wherein a transducer bearing comprises an angle from a transducer beam spread axis to the reference line.

The selecting one or more transducers includes using the transducer bearing information to compare the sound event bearing with transducer bearings of the one or more transducers, under an embodiment.

The selecting one or more transducers includes selecting the one or more transducers when an absolute difference between the sound event bearing and respective transducer bearing is below a threshold value, under an embodiment.

An apparatus is described herein that comprises a microphone array and a plurality of transducers, the microphone array and the plurality of transducers communicatively coupled with at least one processor. The apparatus includes the microphone array for receiving at least one signal. The plurality of transducers are configured to deliver a correction signal. One or more applications running on the at least one processor use information of the at least one signal to detect a sound event, the detecting the sound event including determining a sound event bearing, wherein the sound event bearing comprises an angle from a reference line to a direction of the sound event, the detecting the sound event including instructing the plurality of transducers to direct a correction signal in a direction of the sound event bearing.

The plurality of transducers comprise a linear phased array of transducers, wherein the instructing the plurality of transducers to deliver the correction signal comprises selecting a correction signal phase difference between the transducers of the linear phased array to direct a majority of the corrections signal's sound energy along the sound event bearing, under an embodiment.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems and methods for remote multi-directional bark deterrence can be a component of a single system, multiple systems, and/or geographically separate systems. The systems and methods for remote multi-directional bark deterrence can also be a subcomponent or subsystem of a single system, multiple systems, and/or geographically separate systems. The components of systems and methods for remote multi-directional bark deterrence can be coupled to one or more other components (not shown) of a host system or a system coupled to the host system.

One or more components of the systems and methods for remote multi-directional bark deterrence and/or a corresponding interface, system or application to which the systems and methods for remote multi-directional bark deterrence is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include systems and methods for remote multi-directional bark deterrence can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods for remote multi-directional bark deterrence and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods for remote multi-directional bark deterrence and corresponding systems and methods include: microcontrollers with memory (such as electronically erasable programmable read only memory (EEPROM)), embedded microprocessors, firmware, software, etc. Furthermore, aspects of the systems and methods for remote multi-directional bark deterrence and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods for remote multi-directional bark deterrence is not intended to be exhaustive or to limit the systems and methods to the precise forms disclosed. While specific embodiments of, and examples for, the systems and methods for remote multi-directional bark deterrence and corresponding systems and methods are described herein for illustrative purposes, various equivalent modifications are possible within the scope of the systems and methods, as those skilled in the relevant art will recognize. The teachings of the systems and methods for remote multi-directional bark deterrence and corresponding systems and methods provided herein can be applied to other systems and methods, not only for the systems and methods described above.

The elements and acts of the various embodiments described above can be combined to provide further embodiments. These and other changes can be made to the systems and methods for remote multi-directional bark deterrence and corresponding systems and methods in light of the above detailed description.

What is claimed is:

1. An apparatus comprising,
a microphone array and a plurality of transducers, the microphone array and the plurality of transducers communicatively coupled with at least one processor, the at least one processor communicatively coupled with a memory;
the microphone array for receiving at least one signal;
each transducer of the plurality of transducers configured to deliver a correction signal along a transducer beam spread axis, wherein the plurality of transducers is positioned on the apparatus for providing a combined transducer beam spread coverage in the horizontal plane;
one or more applications running on the at least one processor for using information of the at least one signal to detect a sound event, the detecting the sound event including selecting one or more transducers from the plurality of transducers, the detecting the sound event including instructing the selected one or more transducers to deliver a correction signal, the detecting the sound event including determining a sound event bearing, wherein the sound event bearing comprises an angle from a reference line to a direction of the sound event, the selecting the one or more transducers from the plurality of transducers including comparing the sound event bearing with transducer bearings of the plurality of transducers, wherein a transducer bearing comprises an angle from a respective transducer beam spread axis to the reference line, wherein the memory comprises the transducer bearings.

2. The apparatus of claim 1, the determining the sound event bearing comprising using time difference of arrival of the sound event at two or more microphones of the microphone array.

3. The apparatus of claim 1, the determining the sound event bearing comprising cross correlating signals corresponding to the sound event received by at least two microphones of the microphone array.

4. The apparatus of claim 1, the determining the sound event bearing comprising using a generalized cross correlation and phase amplitude transform applied to signals corresponding to the sound event received by at least two microphones of the microphone array.

5. The apparatus of claim 1, the selecting the one or more transducers from the plurality of transducers including selecting the one or more transducers when an absolute difference between the sound event bearing and respective transducer bearing is below a threshold value.

6. The apparatus of claim 1, wherein the combined transducer beam spread coverage spans ninety (90) degrees or less.

7. The apparatus of claim 1, wherein the combined transducer beam spread coverage is greater than ninety (90) degrees.

8. The apparatus of claim 1, the selecting the one or more transducers from the plurality of transducers including selecting one or more additional transducers.

9. The apparatus of claim 8, wherein the one or more additional transducers comprise a respective beam spread axis adjacent a beam spread axis of the selected one or more transducers in the horizontal plane, wherein the selected one or more transducers comprise the one or more additional transducers.

10. The apparatus of claim 1, wherein the sound event comprises barking of a dog.

11. The apparatus of claim 1, wherein the plurality of transducers comprise an ultrasonic transducer, wherein the correction signal comprises an ultrasonic signal.

12. The apparatus of claim 11, wherein the ultrasonic signal comprises a frequency range between 20 kHz and 50 kHz.

13. The apparatus of claim 11, wherein the ultrasonic signal comprises a sound pressure level between 70 dBA and 130 dBA measured 0.3 meters from the face of the transducer.

14. The apparatus of claim 1, wherein the reference line forms a fixed angle with a line connecting two microphones of the microphone array.

15. The apparatus of claim 1, wherein the reference line comprises magnetic north.

16. A method comprising,
one or more applications running on at least one processor for providing,
receiving at least one signal through a microphone array;
using information of the at least one signal to detect a sound event, the detecting the sound event including determining a sound event bearing, wherein the sound event bearing comprises an angle from a reference line to a direction of the sound event;
selecting one or more transducers using the sound event bearing and transducer bearing information of the one or more transducers, wherein each transducer of the one or more transducers is configured to deliver a correction signal along an axis, wherein the axis comprises a transducer beam spread axis, wherein the transducer bearing information includes a transducer bearing for each transducer of the one or more transducers, wherein a transducer bearing comprises an angle from a transducer beam spread axis to the reference line;
instructing the selected one or more transducers to deliver a correction signal.

17. The method of claim 16, the selecting one or more transducers including using the transducer bearing information to compare the sound event bearing with transducer bearings of the one or more transducers.

18. The method of claim 17, the selecting one or more transducers including selecting the one or more transducers when an absolute difference between the sound event bearing and respective transducer bearing is below a threshold value.

19. An apparatus comprising,
a microphone array and a plurality of transducers, the microphone array and the plurality of transducers communicatively coupled with at least one processor;
the microphone array for receiving at least one signal;

the plurality of transducers configured to deliver a correction signal;

one or more applications running on the at least one processor for using information of the at least one signal to detect a sound event, the detecting the sound event including determining a sound event bearing, wherein the sound event bearing comprises an angle from a reference line to a direction of the sound event, the detecting the sound event including instructing the plurality of transducers to direct a correction signal in a direction of the sound event bearing, wherein the plurality of transducers comprises a linear phased array of transducers, wherein the instructing the plurality of transducers to deliver the correction signal comprises selecting a correction signal phase difference between the transducers of the linear phased array to direct a majority of the corrections signal'sound energy along the sound event bearing.

\* \* \* \* \*